INVENTORS
David Kleitman
Lewis K. Russell
Alan B. Grebene
BY Flehr, Hohbach, Test,
Albritton & Herbert Attorneys INVENTORS
David Kleitman
Lewis K. Russell
Alan B. Grebene
BY Fish, Hohlbach, Test, Albritton & Herbert
Attorneys INVENTORS
David Kleitman
BY Lewis K. Russell
Alan B. Grebene
Flehr, Hohbach, Test,
Albritton & Herbert Attorneys INVENTORS
David Kleitman
Lewis K. Russell
Alan B. Grebene
BY Flehr, Hohbach, Test,
Albritton & Herbert Attorneys INVENTORS
David Kleitman
Lewis K. Russell
Alan B. Grebene
BY Flehr, Hohbach, Test, Albritton & Herbert
Attorneys INVENTORS
David Kleitman
BY Lewis K. Russell
Alan B. Grebene
Flehr, Hohbach, Test,
Albritton & Herbert Attorneys INVENTORS
David Kleitman
BY Lewis K. Russell
Alan B. Grebene
Flehr, Hohbach, Test,
Albritton & Herbert
Attorneys INVENTORS
David Kleitman
BY Lewis K. Russell
Alan B. Grebene
Flehr, Hohbach, Test,
Albritton & Herbert Attorneys INVENTORS
David Kleitman
Lewis K. Russell
Alan B. Grebene
BY Flehr, Hohbach, Test, Albritton & Herbert
Attorneys INVENTORS
David Kleitman
Lewis K. Russell
Alan B. Grebene
BY Flehr, Hohlbach, Test,
Albritton & Herbert
Attorneys INVENTORS
David Kleitman
Louis K. Russell
Alan B. Grebene
BY Flehr, Hohbach, Test, Albritton & Herbert
Attorneys INVENTORS
David Kleitman
Lewis K. Russell
Alan B. Grebene
BY Flehr, Hohbach, Test, Albritton & Herbert
Attorneys INVENTORS
David Kleitman
BY Lewis K. Russell
Alan B. Grebene
Flehr, Hohbach, Test,
Albritton & Herbert Attorneys INVENTORS
David Kleitman
Louis K. Russell
Alan B. Grebene
BY Fleh, Hohbach, Test, Albritton & Herbert
Attorneys INVENTORS
David Kleitman
Lewis K. Russell
Alan B. Grebene
BY Flehr, Hohbach, Test, Albritton & Herbert
Attorneys June 13, 1972 D. KLEITMAN ET AL 3,669,666

METHOD FOR INTEGRATED CIRCUIT MASK FABRICATION AND ASSEMBLY USED THEREWITH

Filed Dec. 8, 1969 21 Sheets-Sheet 16

INVENTORS
David Kleitman
Lewis K. Russell
Alan B. Grebene

BY Flehr, Hohbach, Test, Albritton & Herbert Attorneys

INVENTORS
David Kleitman
Lewis K. Russell
Alan B. Grebene
BY Flehr, Hohbach, Test, Albritton & Herbert Attorneys INVENTORS
David Kleitman
BY Lewis K. Russell
Alan B. Grebene
Flehr, Hohbach, Test,
Albritton & Herbert Attorneys INVENTORS
David Kleitman
Lewis K. Russell
Alan B. Grebene
BY Flehr, Hohbach, Test, Albritton & Herbert
Attorneys INVENTORS
David Kleitman
Lewis K. Russell
Alan B. Grebene
BY Flehr, Hohbach, Test,
Albritton & Herbert Attorneys INVENTORS
David Kleitman
Lewis K. Russell
Alan B. Grebene
BY Flehr, Hohbach, Test,
Albritton & Herbert Attorneys

United States Patent Office 3,669,666

Patented June 13, 1972

3,669,666

METHOD FOR INTEGRATED CIRCUIT MASK FABRICATION AND ASSEMBLY USED THEREWITH

David Kleitman, Los Altos Hills, Lewis K. Russell, Livermore, and Alan B. Grebene, Sunnyvale, Calif., assignors to Signetics Corporation, Sunnyvale, Calif.

Filed Dec. 8, 1969, Ser. No. 882,905
Int. Cl. G03c 5/04
U.S. Cl. 96—41 10 Claims

ABSTRACT OF THE DISCLOSURE

A method for integrated circuit mask fabrication. After the integrated circuit has been designed, the masks for making the integrated circuits are prepared by preparing a number of negatives and positives from the circuit which has been designed. Each of the negatives or positives is modified by paste-ins, cut-outs, ink-ins or erasures to provide on the negative or the positive the pattern for the particular mask desired. In the method, no critical dimension need be adhered to for modifying the negatives or positives because each negative is automatically related to the other. All critical perimeters or location edges for the circuit are accurately reproduced in accordance with the original from which the negative or positive was prepared. The lines which form the circuit are wide enough so that non-critical hand paste-ins, ink-ins, erasures and the like can be utilized. Each modified negative is converted to a positive. These positives and any converted positives can then be photographed by the use of a conventional reduction and step and repeat processes to provide the actual masks which are utilized in fabricating integrated circuits.

BACKGROUND OF THE INVENTION

In copending application Ser. No. 824,197, filed May 13, 1969, there is disclosed a method for making an integrated circuit in which standard patterns utilized in the integrated circuit are placed on a sheet of substantially transparent dimensionally stable material and then the non-standard parts are drawn. With that invention, it was contemplated that the actual mask which was utilized in the fabrication of the integrated circuits would be prepared from "Rubylith" sheets which would have portions cut away in accordance with the pattern of the integrated circuit. The "Rubyliths" would then be photographed by a reduction and step and repeat process to provide the actual masks utilized in the integrated circuit fabrication. It has been found that the making of these "Rubylith" masks has been very expensive and time consuming. Also, this process often necessitated the use of expensive equipment such as "Coordinatographs." However, even with such equipment, the making of the "Rubyliths" required considerable effort and time in their preparation. Therefore, there is a need for a new and improved method for the fabrication of integrated circuit masks.

SUMMARY OF THE INVENTION AND OBJECTS

The method for integrated circuit mask fabrication consists of the steps of preparing a plurality of negatives and positives from a drawing of the integrated circuit. The drawing is many times the size of the integrated circuit and has the pattern thereon defined by relatively wide lines which have certain critical perimeters that are accurately drawn. The negatives and the positives are modified so that each can be utilized for making one of the masks required for fabrication of the integrated circuit. A mask is then made utilizing these modified negatives and positives. Manufacture of the integrated circuit is facilitated because the negatives and the positives are all coherent because they are made from the same original drawing. The modification to the negatives and the positives can be accomplished in many ways.

In general, it is an object of the present invention to provide a method for integrated circuit mask fabrication which makes it unnecessary to prepare "Rubyliths."

Another object of the invention is to provide a method of the above character in which the masks can be made by modifying negatives and positives of a drawing of the integrated circuit.

Another object of the invention is to provide a method of the above character in which the critical dimensions of the integrated circuit are retained even though many parts or areas are utilized which are non-critical in dimensions.

Another object of the invention is to provide a method of the above character in which all of the critical location edges are retained.

Another object of the invention is to provide a method of the above character which can be performed by hand by relatively unskilled personnel.

Another object of the invention is to provide a method of the above character in which all of the masks which are prepared are dimensionally interrelated.

Another object of the invention is to provide a method of the above character in which it is possible to utilize the same negative by simple modifications to make more than one of the masks which are utilized in the integrated circuit.

Another object of the invention is to provide a method of the above character which can be utilized with bipolar and MOS devices.

Another object of the invention is to provide an assembly which can be utilized in connection with the method for integrated circuit mask fabrication.

Another object of the invention is to provide a method of the above character which is particularly adaptable for use with large scale integration.

Additional objects and features of the invention will appear from the following description in which the preferred methods and the preferred embodiments of the assembly are set forth in detail in conjunction with the accompanying drawing.

BRIEF DESCRIPTION OF THE DRAWING

FIGS. 29A–29D are cross-sectional views in which FIG. 29D is taken along the line 29D—29D of FIG. 28. FIGS. 29A–29D show the manner in which the four masks which have been prepared in accordance with the present method are utilized to produce an MOS device in the integrated circuit shown in FIG. 16.

FIG. 30 is an enlarged view of a portion of the integrated circuit shown in FIG. 16 and in particular shows a cross-under.

FIG. 31 is an enlarged partial plan view of the area included within line 31—31 of FIG. 30.

FIG. 32 is a cross-sectional view taken along the line 32—32 of FIG. 31.

DESCRIPTION OF THE PREFERRED EMBODIMENTS

Figure 2:
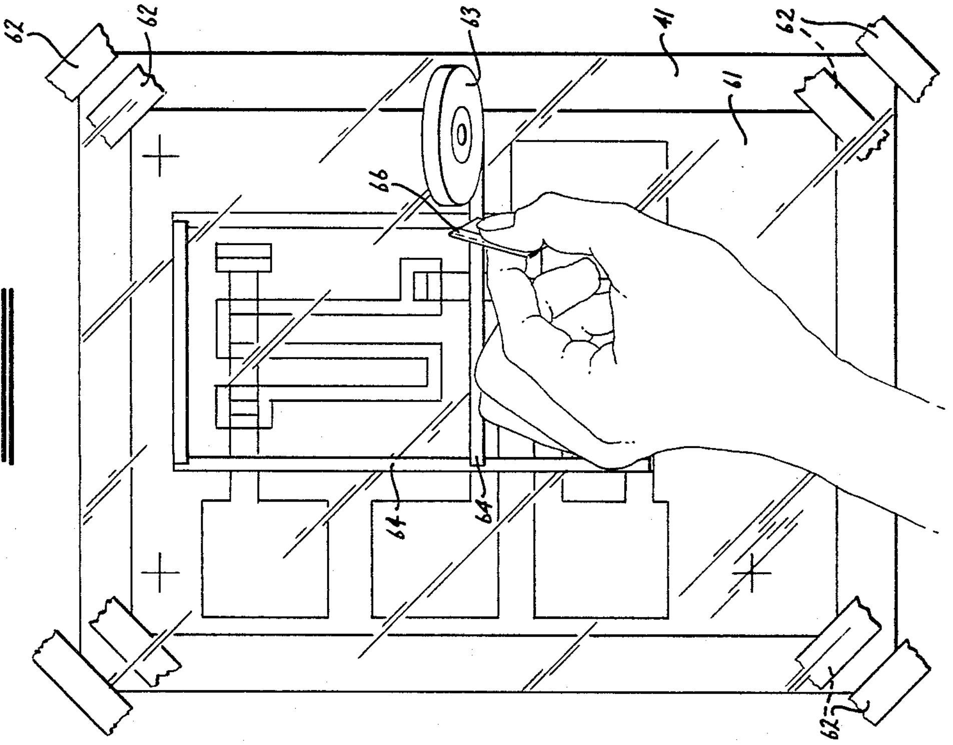
FIG. 2 is a plan view showing a method incorporating the present invention for making a positive utilizing strips of opaque material and having a precision width.

The method for fabricating integrated circuit masks in accordance with the present invention is commenced by completing a layout of the integrated circuit as described in copending application Ser. No. 824,197, filed May 13, 1969. As described therein, the layout of the integrated circuit is completed by taking copies of the standard parts of the integrated circuit and placing them on a sheet of substantially transparent dimensionally stable material. The non-standard parts of the integrated circuit are drawn onto the sheet as well as the necessary structure for interconnecting the standard and non-standard parts to provide the composite pattern making up the integrated circuit. Thus, such an assembly consists of a substantially transparent dimensionally stable sheet which has fastened thereto positive copies of the standard patterns with interconnecting circuitry drawn on the dimensionally stable sheet. Alternatively, if desired, the drawing for the integrated circuit can be perpared in a conventional manner and this also can be utilized in connection with the present method.

Figure 1:
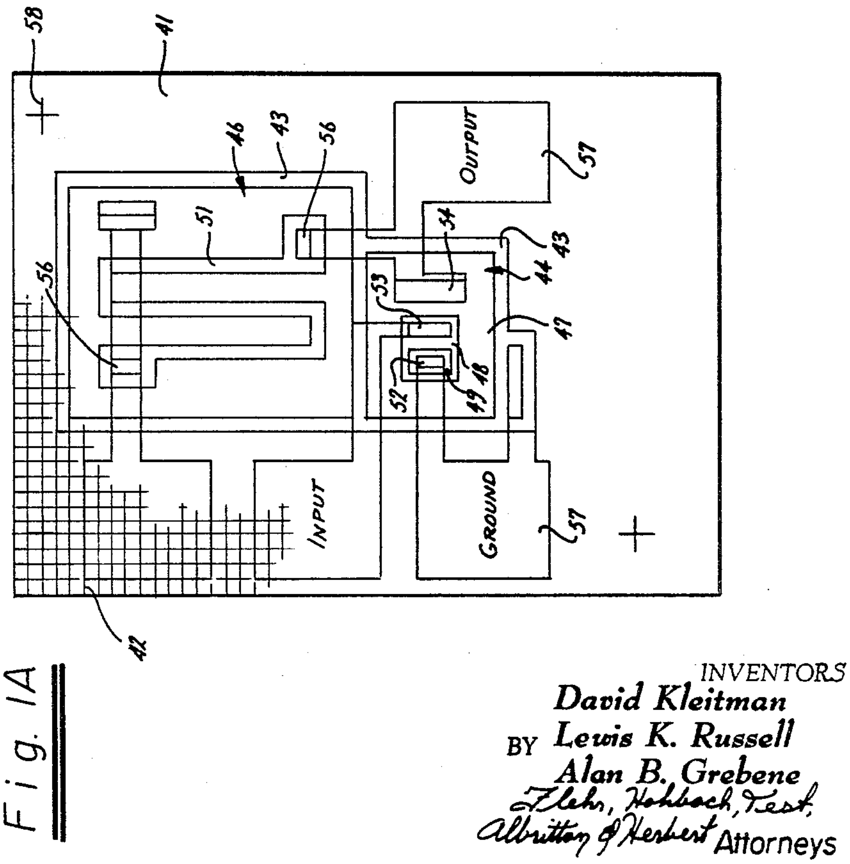
FIG. 1 is a plan view of a drawing of a typical, very simple integrated circuit for which masks are to be made in accordance with a method incorporating the present invention.
Figure 1A:
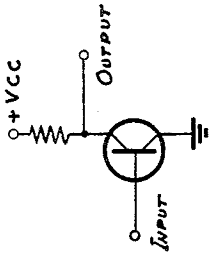
FIG. 1A illustrates in a conventional manner the circuit which is shown in FIG. 1.
Figure 4:
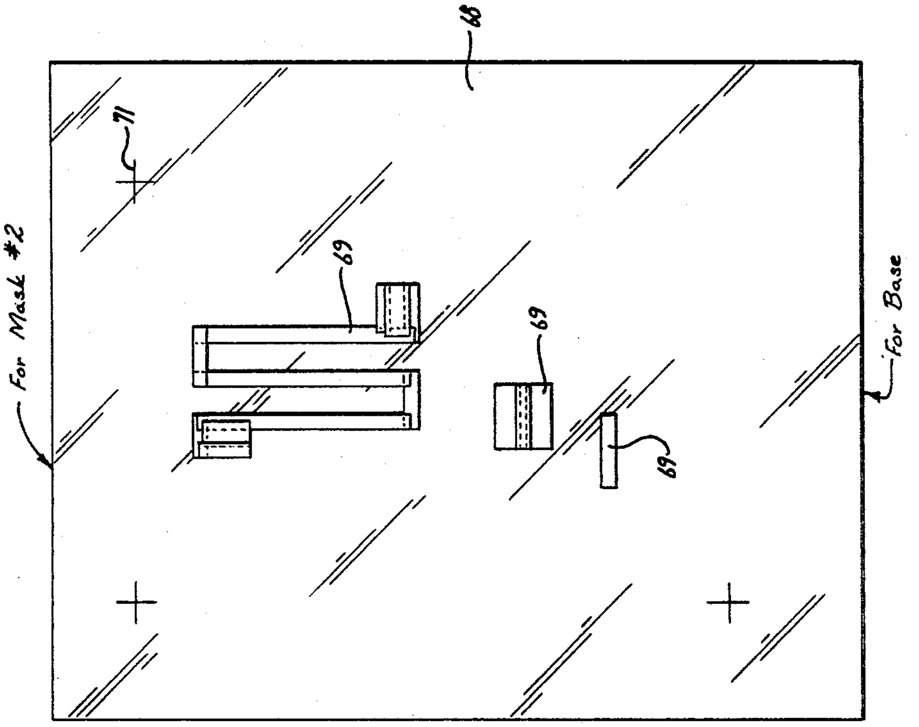
FIGS. 3, 4, 5, 6 and 7 show positives which have been prepared in accordance with the present method for the making of a set of masks, namely masks 1–5, for the integrated circuit as shown in FIG. 1.

In FIG. 1 there is shown a layout for a very simple integrated circuit. This layout consists of a sheet 41 of susbtantially transparent, dimensionally stable material of a suitable type such as Mylar. As shown, the sheet 41 is provided with a plurality of grid lines 42 to facilitate positioning of the parts which make up the integrated circuit. The integrated circuit itself can be of conventional construction and thus, for example, it can consist of a P-type substrate upon which an N-type epitaxial layer has been deposited and which has an N+ buried layer. P-type isolation posts 43 can be provided to form two isolated areas 44 and 46. In the area 44, the N— material can serve as a collector 47. A P-type impurity can be diffused into the area to provide a P-type base 48 and N+ material can be diffused into the P-type base to provide an N+ emitter 49. A diffused resistor can be provided in the area 46 by diffusing a P-type impurity into the area to form the resistor 51. N+ regions can be provided in both the areas 44 and 46 to make contact to the collector region and to make contacts to the P-type regions for the resistors. Metallization is then provided to form contacts 52, 53 and 54 which serve as emitter, base and collector contacts, respectively. Contacts 56 are provided for the resistor 51. A plurality of contact pads 57 are provided which are connected to the contact elements as shown. The circuit which is formed is shown in FIG. 1A.

The sheet 41 is provided with registration marks 58 which can be utilized for marking the sheets which are utilized for making the mask as hereinafter described to ensure that the masks will all be in registration with each other and with the pattern which is carried by the sheet 41.

After the layout which is shown in FIG. 1 has been completed, a sheet 61 of a substantially transparent, dimensionally stable material such as Mylar is placed over the sheet 41 and then both are held in place by strips of tape 62. Let it be assumed that it is desired to fabricate one of the masks needed for making the integrated circuit which is shown in FIG. 1. To do this, a sheet 61 of substantially transparent, dimensionally stable material is placed over the sheet 41 and both sheets are held in place by strips of tape 62. Let it be assumed that it is desired to form the isolation mask which is to be utilized for forming holes in the oxide through which the diffused posts 43 can be formed. A roll of tape 63 is taken which has tape of the desired width. For this purpose, it is again desirable to utilize a dimensionally stable material having a precise width. As is well known to those skilled in the art, there is a very substantial reduction when the mask is photographed as, for example, 500 to 1 reduction. The width of the tape is chosen so that when it is reduced to the final size, the tape will correspond to the desired dimension for which it is to be used in the integrated circuit as, for example, 5 microns, 7½ microns, 10 microns or 15 microns or any other desired dimension. Thus, tape having a relatively standard dimension as, for example, 3½ millimeters or 5 millimeters can be utilized. The tape on the roll 63 is provided with a suitable pressure sensitive adhesive. Strips 64 of the tape are superimposed over the isolation regions 43 and are cut to the desired length by an Exacto knife or razor blade 65 as shown. As can be seen from FIG. 2, the edge definition for the isolation region is determined by the precise side edges of the tape 62. From the arrangement shown, it can be seen that only some of the cuts which are made in the tape must be precise, whereas most of the cuts can be quickly made since they terminate within the confines of the edges of the tape.

In the event that there is a relatively large region which is to be covered by the tape, two of the strips of tape 64 can be utilized for defining the edges of the area and any gap remaining in the middle can be readily filled by an overlying strip 66 whose position is not critical. It is merely necessary that the strip 66 cover the gap and not extend beyond the side edges of the strips 64 which has been precisely positioned.

Before or after the taping has been completed on the sheet 61, registration marks 67 are placed on the sheet 61 which immediately overlie the registration marks 58 on the sheet 41 below. This ensures that the sheet 61 can be readily positioned so that it will be in proper alignment with the device which is to be made and with the other masks which are to be utilized.

Figure 3:
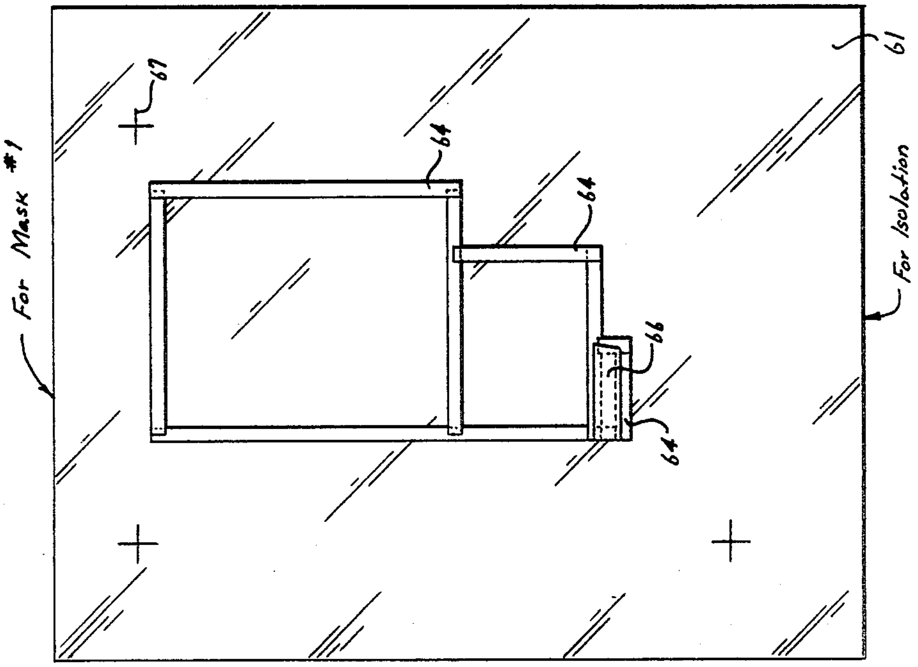
Figure 6:
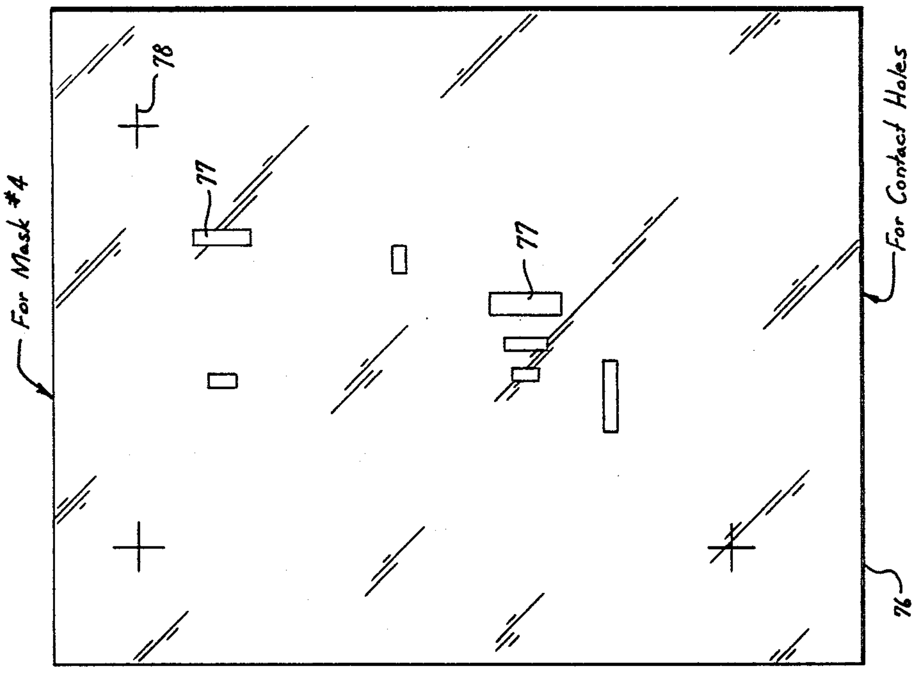
Figure 5:
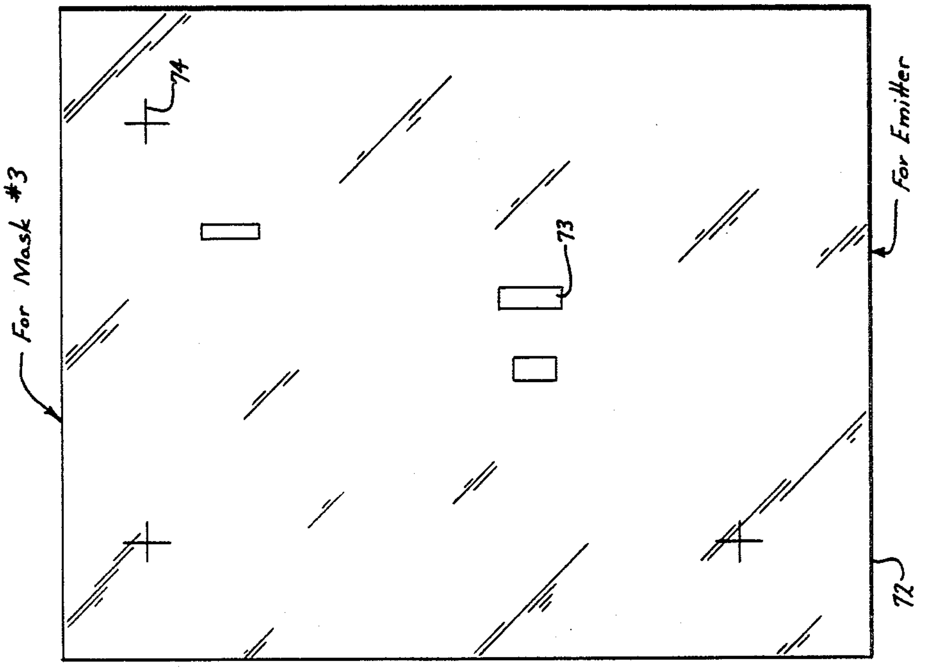

The completed work for the isolation mask is shown in FIG. 3. The sheet 61 with the tape strips thereon can be mounted on a wall and photographed in a conventional manner to provide the masks which is utilized for forming the isolation. Typically, this is called mask No. 1 and is carried by a glass substrate. In doing the photographing, there is a field reversal. Alternatively if desired, a field reversal can be obtained by making a contact print by utilizing a Color-Key sheet and developing the same. This then can be photographed and reduced directly to make the mask. Thus, it can be seen that a mask can be readily made with the present method merely by using pieces of "Rubylith" stick-on tape. This is possible because the "Rubylith" tape is readily available in precise widths so that the line definitions required in the mask can be readily maintained without the utilization of a precise cutting tool or a "Coordinatograph."

After the first mask has been prepared, the other masks can be prepared in a similar manner. The masks can be made in any desired order. If it is desired to reduce the number of Mylar sheets which are utilized for making the masks, it would be preferable to make up a mask 4 as hereinafter described because it will contain the smallest strips of "Rubyliths," and thereafter go on to the third mask which contains many of the previous opaque areas except on an enlarged scale so that it is only necessary to utilize a wider "Rubylith" tape which might be overlaid over the "Rubylith" tape on the Mylar sheet. The other mask can also be made utilizing the same sheet merely by stripping off or taping on additional "Rubylith" tape sections. Thus, a sheet containing the opaque "Rubylith" strips can be readily modified by peeling off the unnecessary parts and taping on wider tapes on those parts that remain. This has the distinct advantage that it is unnecessary to start with a clean sheet each time and, therefore, there should be a substantial saving in time and making the mask. In addition, this helps to ensure that all the masks will be in proper alignment.

It should be pointed out that the sheet 61 should be substantially transparent and the strips 64 and 67 should be opaque. For example, with Mylar and "Rubylith," the Mylar would be transparent to ultra-violet, whereas the "Rubylight" would be opaque to ultra-violet.

In reviewing the masks required for making the structure which is shown in FIG. 1, it is desirable to make mask 1 and then mask 4. Thereafter, it is desirable to go to mask 2 and then from mask 2 to mask 3. However, in going from mask 2 to mask 3, there is extensive modification required which might make it desirable to go to a new sheet of transparent material.

To facilitate explanation of the method for making the masks, let it be assumed that a separate sheet of substantially transparent, dimensionally stable material is utilized for each of the masks. Thus, for mask 2, there is used a sheet 68 of this material. After the sheet 68 is placed over the sheet 41, strips 69 of "Rubylith" tape are stuck onto the sheet 68 to cover the areas through which the base diffusion is to be made. As can be seen, this, in addition to the base area for the transistor, includes the area for the resistor. The outer margins of the tape precisely define the regions through which the base diffusion is to be made. Registration marks 71 are placed on the sheet 68 immediately overlying the registration marks 58.

It will be noted that some of the strips 69 overlie each other. As pointed out previously, this is unimportant. It is only important that the outer margins of the tape precisely define the regions in which the base diffusion is to occur.

After sheet 68 has been completed, it can be photographed in a manner hereinbefore described to provide mask 2 for the base diffusion.

To form mask 3, a sheet 72 of substantially transparent, dimensionally stable material is placed over the sheet 41, and thereafter appropriate portions 73 of "Rubylith" tape are stuck on or pasted onto the sheet 72 to define the areas through which the emitter diffusion is to occur. Registration marks 74 overlying the marks 58 are also provided. As soon as this has been completed, the sheet 72 can be photographed to provide mask 3.

To make mask 4, a sheet 76 of substantially transparent, dimensionally stable material is placed over the sheet 41 and strips 77 of "Rubylith" tape are stuck onto or pasted onto the sheet 76 upon the areas through which contact holes are to be formed in the oxide. Registration marks 78 again are provided. After the sheet has been completed, it is photographed to provide mask 4.

To make mask 5, a sheet 81 of a substantially transparent, dimensionally stable material is placed over the sheet 41 and registration marks 82 are applied. Thereafter, a large number of strips 83 are placed over the areas in which it is desired that metllization remain. After this has been completed, the sheet 81 is photographed to make mask 5.

From the foregoing, it can be seen that a complete mask set has been made for making the circuit which is shown in FIG. 1. All of the masks have been made by utilizing sheets of substantially transparent, dimensionally stable material and pasting thereon flexible opaque strips to delineate the areas through which no light is to pass. It can be seen that the mask set can be made very quickly by relatively unskilled personnel.

Figure 8:
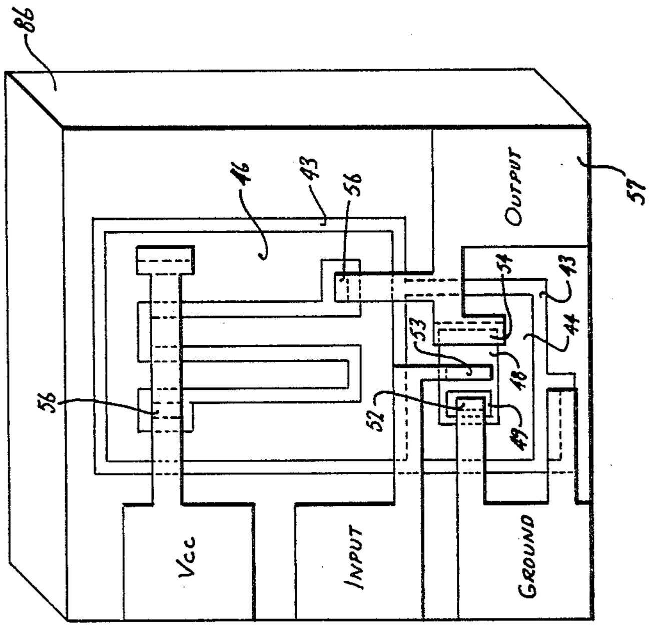
FIG. 8 is an isometric view of an integrated circuit made with the masks shown in FIGS. 2–7.
Figure 7:
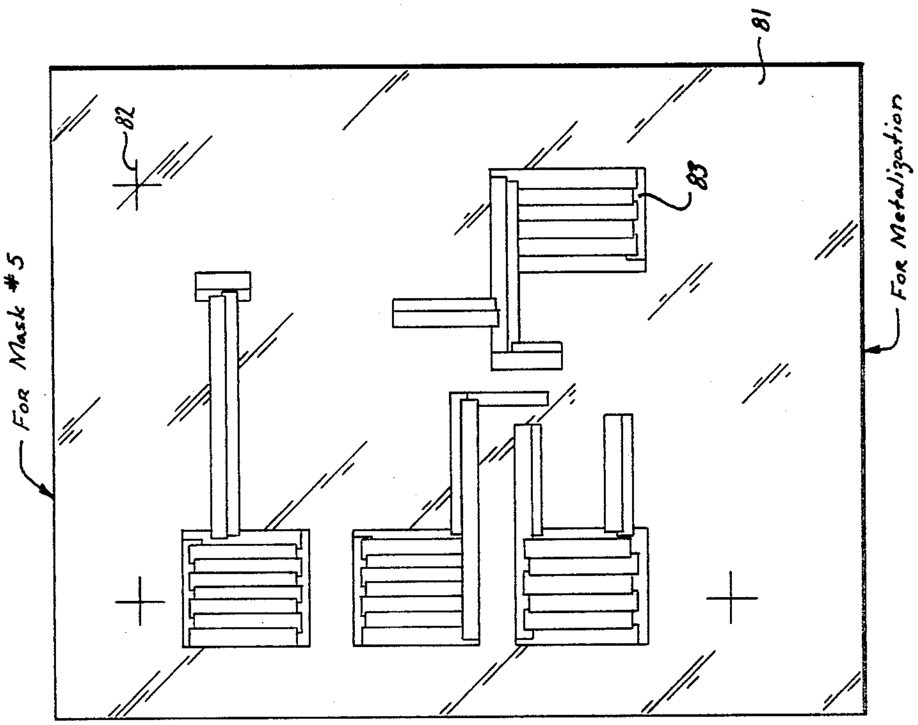

A comleted circuit made utilizing the masks hereinbefore described is shown in FIG. 8 in which the integrated circuit is formed in a semiconductor body 86.

Figure 9:
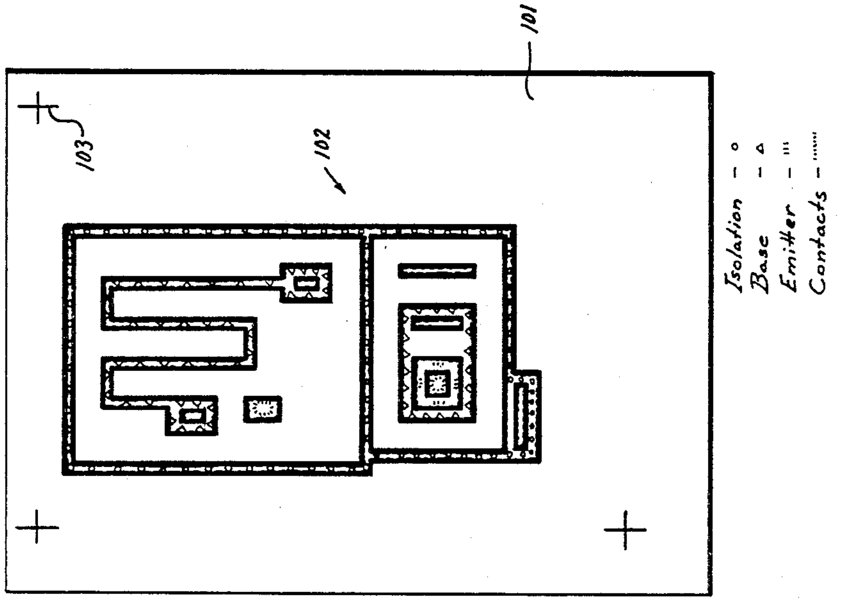
FIG. 9 is a partially completed drawing of an integrated circuit in which the outer margins of the pattern utilized in the integrated circuit are precisely defined.

Another embodiment of the method for integrated circuit mask fabrication is shown in FIGS. 9 through 15. As shown in FIG. 9, in place of making a line drawing of the integrated circuit as shown in FIG. 1, there is drawn on a sheet 101 of a substantially transparent, dimensionally stable material an integrated circuit 102 which is substantially identical to the integrated circuit which is shown in FIG. 1. However, in the integrated circuit shown in FIG. 1, the outer margins of the lines which define the integrated circuit in FIG. 1 need not be precisely drawn because these lines are subsequently defined by the "Rubylith" tapes of precision width which are pasted on the Mylar sheets. In the integrated circuit 102 which is shown in FIG. 9, the outer margin of each of the regions of the integrated circuit is precisely defined by an opaque ink such as India ink. As can be noted from FIG. 9, it is only necessary that the outer margin of each of the regions be precisely defined. The inner margins can vary and be imprecise as shown. In addition, it is not necessary that the inner regions be covered with ink. As will be noted, the various regions of the integrated circuit 102 are coded in accordance with the step is to be performed. Thus, the isolation regions are indicated by a certain symbol, the base region by another symbol, and so forth as indicated in FIG. 9. This is for the purpose of facilitating of making of masks by relatively unskilled personnel as hereinafter described. The sheet 101 is provided with registration marks 103 similar to those hereinbefore described. The metallization which is required for the integrated circuit can also be drawn on the sheet 101 similar to the manner in which it is drawn in FIG. 1. or, alternatively, the metallization can be provided on a separate sheet so that it will be unnecessary to make as many erasures as hereinafter described.

As soon as the drawing in FIG. 9 has been completed, a number of positives of the integrated circuit 102 which is shown on the drawing are produced in a suitable manner. For example, Color-Key sheets manufactured by the 3M Company can be used. Such material is desirable because it can be utilized with normal room lighting and can be exposed by the use of ultra-violet light. Such a material is desirable because it utilizes a dimensionally stable base. Using Color-Key sheets, the desired number of positives are made by first making a negative of the integrated circuit by making a contact print of the integrated circuit and the negative.

Figure 10:
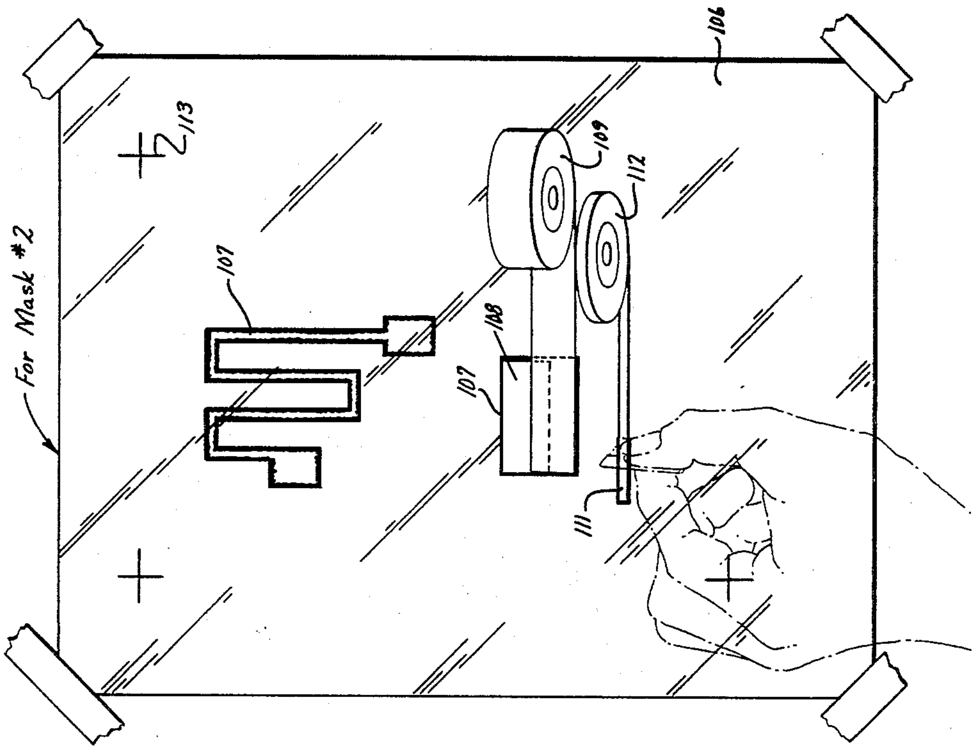
FIG. 10 shows another method for making masks incorporating the present invention and shows a positive being modified to be revised for making mask #2 for the circuit shown in FIG. 9.
Figure 11:
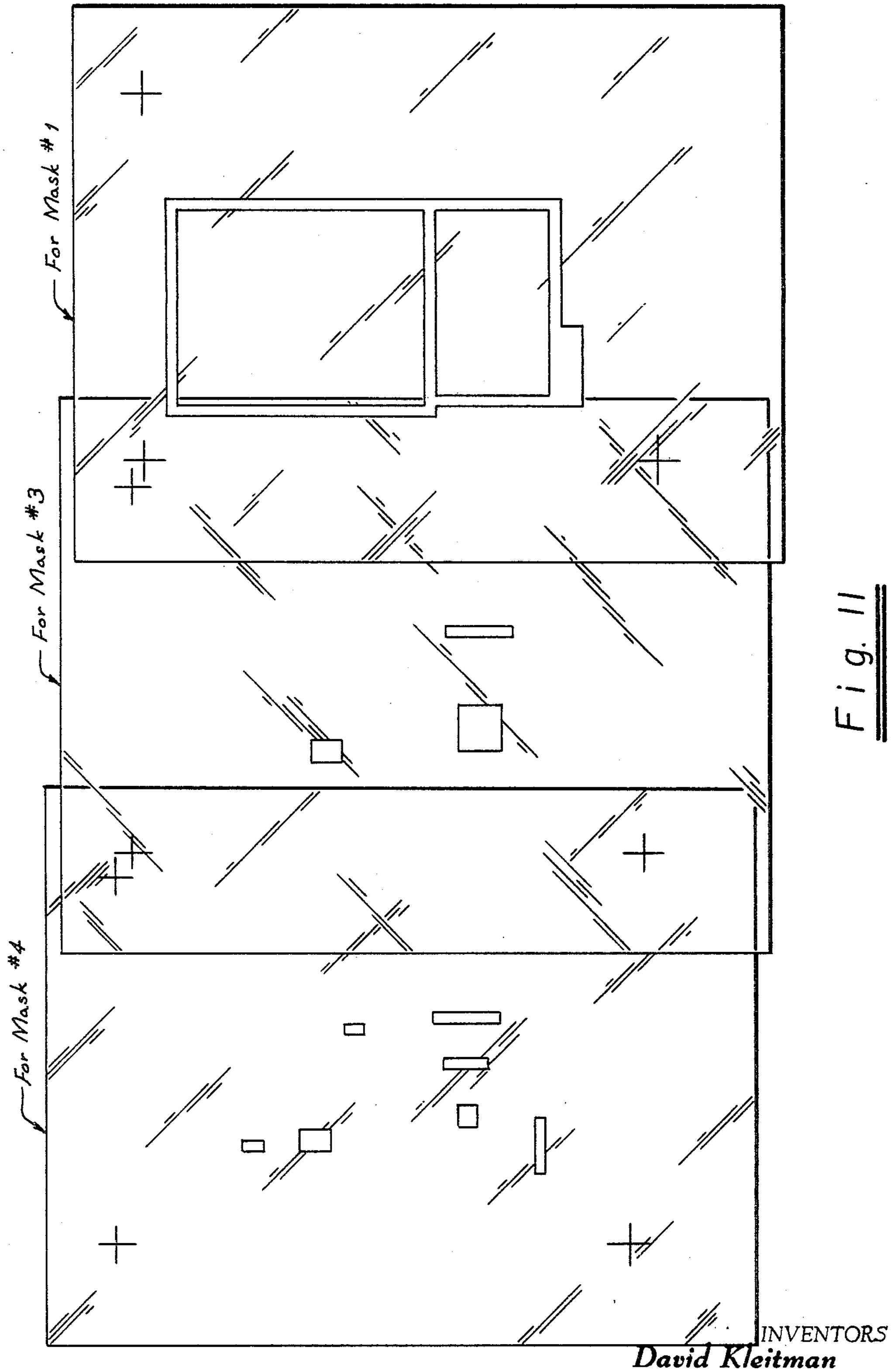
FIGS. 11 and 12 show completed modified positives made in accordance with the present method which is utilized for making masks #1, #3, #4 and #5 for the circuit shown in FIG. 9.
Figure 12:
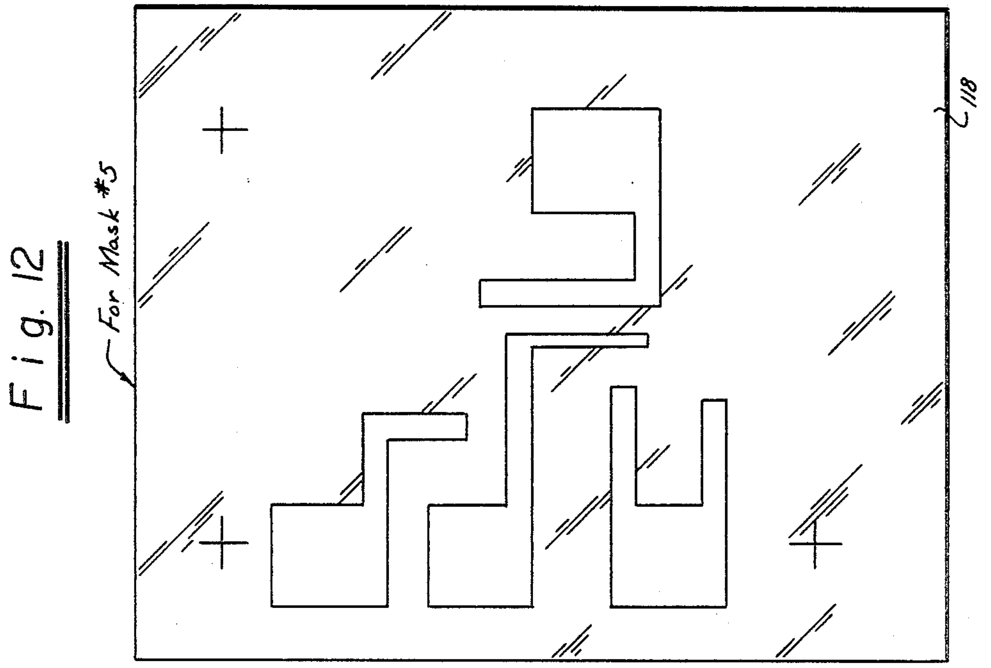

One of the positive sheets is shown as sheet 106 in FIG. 10. Let it be assumed that it is desired to utilize the positive sheet 106 for making mask 2. Mask 2 is for the base regions which are indicated by the diamond symbol as shown in FIG. 9. The operator by merely checking the symbols and knowing that mask 2 is to be made with the sheet 106 merely takes an eraser and erases all of the pattern appearing on a sheet 106 except for the areas through which the base diffusion is to be made. As soon as this has been completed, there only remains the portions of the integrated circuit which are shown in FIG. 10. The pattern 107 which remains corresponds to the inked pattern appearing on the sheet 101. The outer margins of the pattern are very precise, whereas the inner margins can be imprecise and very rough as shown in FIGS. 9 and 10. Since it is desired that all of the areas within the pattern 107 be opaque for making mask 2, this opacity can be obtained by taking "Rubylith" strips 108 of the desired width from a roll 109 and sticking or pasting them onto the sheet 106. The "Rubylith" strips 108 are cut so that they cover all of the regions which are to be covered within the patterns 107 but do not extend beyond the outer margins of the patterns 107. Narrower strips 111 taken from a roll 112 can be utilized for covering smaller areas. With such a method, it can be seen that the precise dimensions of the regions in which operations are to be carried out are defined by the outer margins of the lines forming the pattern 107 and that the opacity within the patterns 107 is obtained by the "Rubylith" strips. In this arrangement, the outer margins of the "Rubylith" strips do not serve to provide edge definition as they do in the method hereinbefore described. Registration marks 113 are placed on a sheet 106 in alignment with the registration marks 103 on the sheet 101. The sheets 114, 116, 117 and 118 for making masks 1, 3, 4 and 5, respectively, are shown in FIGS. 11 and 12. These sheets are treated in a manner similar to sheet 106. The undesired portions of the integrated circuit are erased from the sheet and thereafter, the portions of the pattern which remain which are not opaque are covered with a suitable opaque material such as the "Rubylith" strips as hereinbefore described. The advantage in utilizing this method is that the precision edges for the patterns are defined by the pattern which was originally drawn on the sheet 101. After the sheets 106, 114, 116, 117 and 118 have been completed, they can be photographed in a conventional manner to provide the necessary masks.

Figure 14:
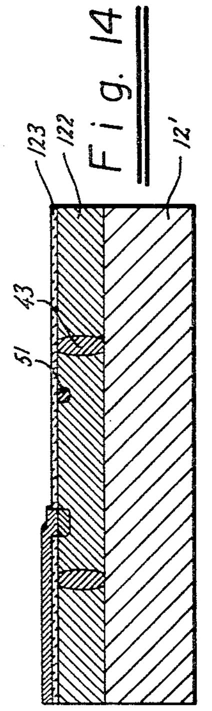
FIG. 14 is a cross-sectional view taken along the line 14—14 of FIG. 13.
Figure 13:
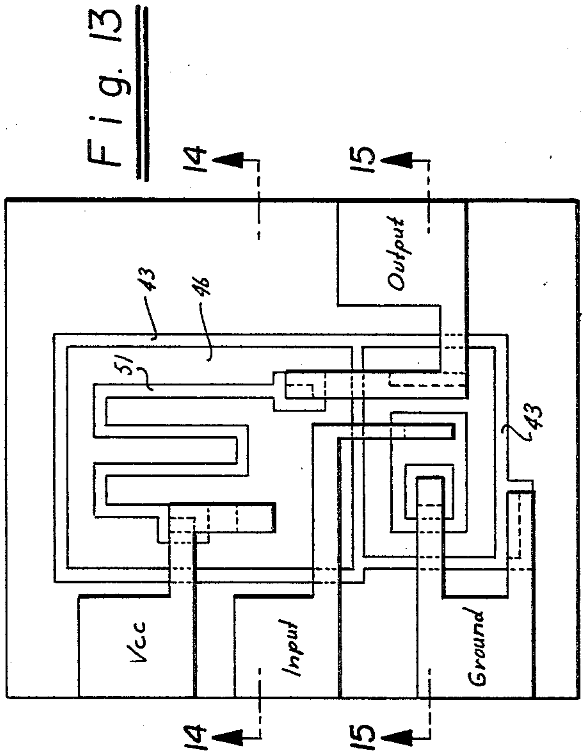
FIG. 13 is a plan view of an integrated circuit made with the masks made from the positives shown in FIGS. 10–12.
Figure 15:
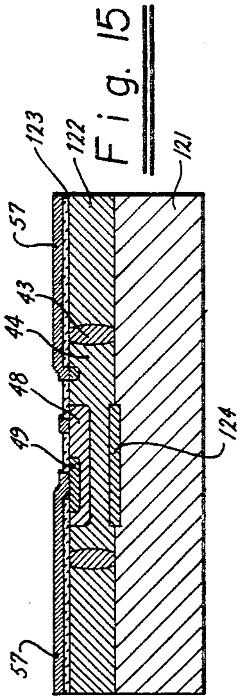
FIG. 15 is a cross-sectional view taken along the line 15—15 of FIG. 13.

An integrated circuit made with such a mask set is shown in FIG. 13. Cross-sectional views of the integrated circuit are shown in FIGS. 14 and 15. For identification purposes, the various parts of the circuit have been numbered in accordance with the integrated circuit described in FIG. 1. The semiconductor body is identified as 121, the epitaxial layer deposited thereon is identified as 122, and the oxide layer is identified as 123. The N+ buried layer is identified as 124.

From the foregoing, it can be seen that the masks can be readily made. The unwanted lines can be either erased by a rubber or gum eraser or they may be rubbed out by using trichloroaleythylene and a cue tip swab. Such material would dissolve the Color-Key material which it is desired to remove.

It should be apparent that alternatively to filling the transparent spaces in the pattern by "Rubylith" material, the spaces can be filled in by utilizing an opaque ink such as black ink and applying it with a brush or pen.

The foregoing methods have been described in conjunction with the fabrication of integrated circuits utilizing bipolar devices. The method is also applicable to the fabrication of masks for integrated circuits utilizing MOS devices.

Figure 16:
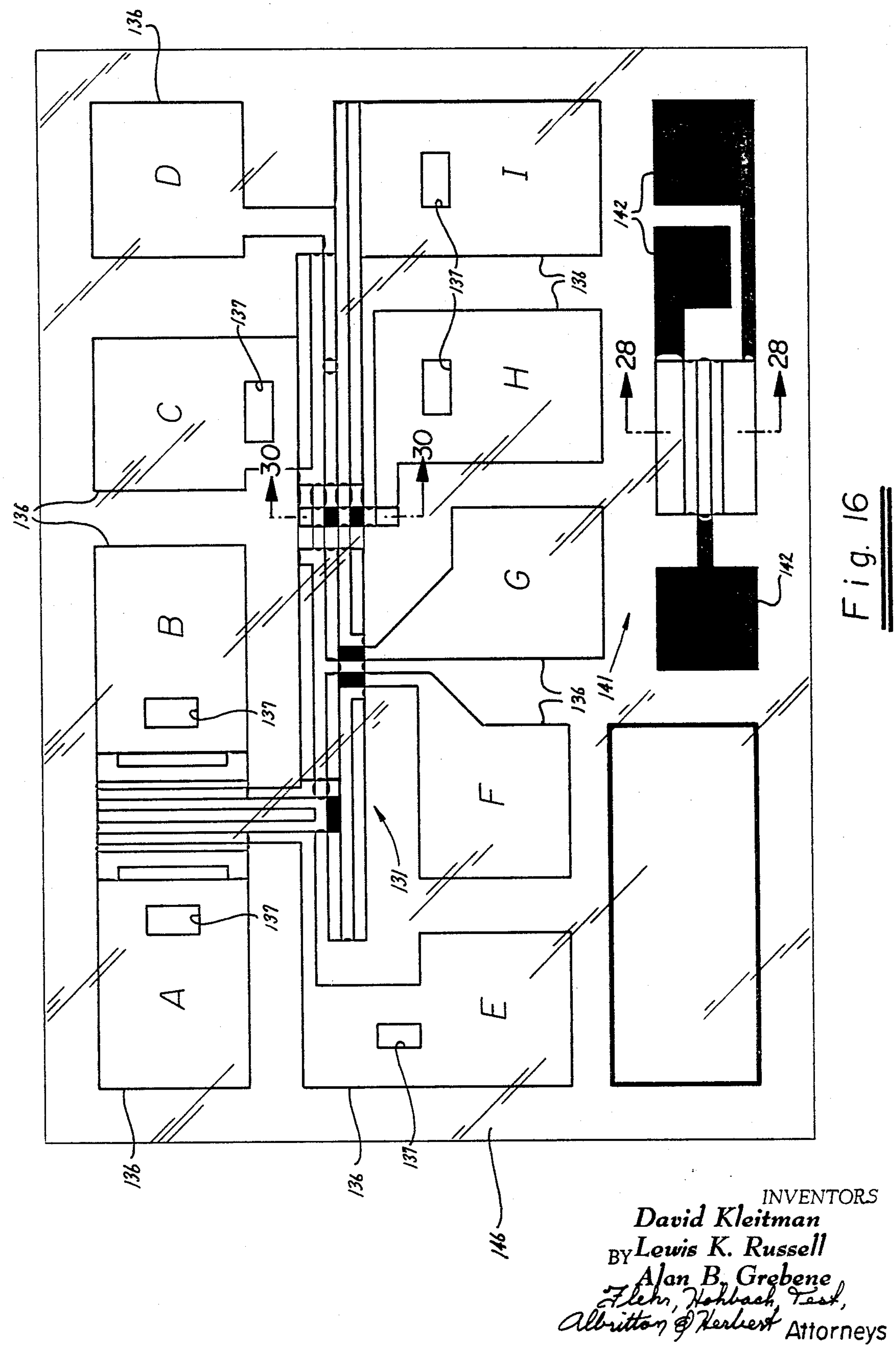
FIG. 16 is a plan view of a drawing of an integrated circuit utilizing MOS devices which is to be utilized for the preparation of masks.
Figure 16A:
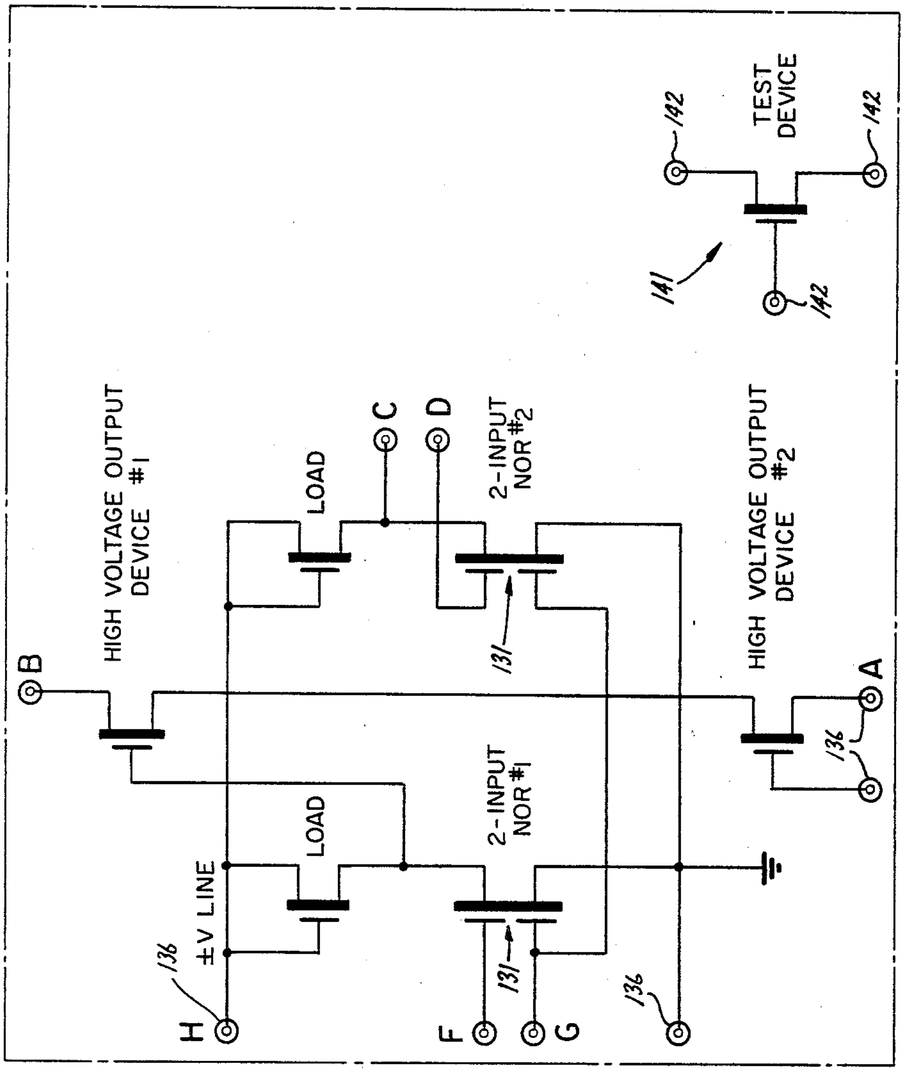
FIG. 16A is a schematic circuit diagram of the integrated circuit shown in FIG. 16.

In FIG. 16 there is shown a drawing of an integrated circuit utilizing MOS devices. Typically, as shown, such an integrated circuit can include active devices 131 as shown in FIG. 16A. It also includes a plurality of contact pads 136, lettered A–I, which form a part of the integrated circuit and which form the connections to the devices 131. Certain of the contact pads 136 are provided with openings 137 by which to prevent the person fabricating the integrated circuit from making bonds to the contact pad 136 too close to the MOS devices. In the lower right-hand corner of the drawing in FIG. 16 there is provided a test transistor 141 which is provided with contact pads 142.

Figure 17:
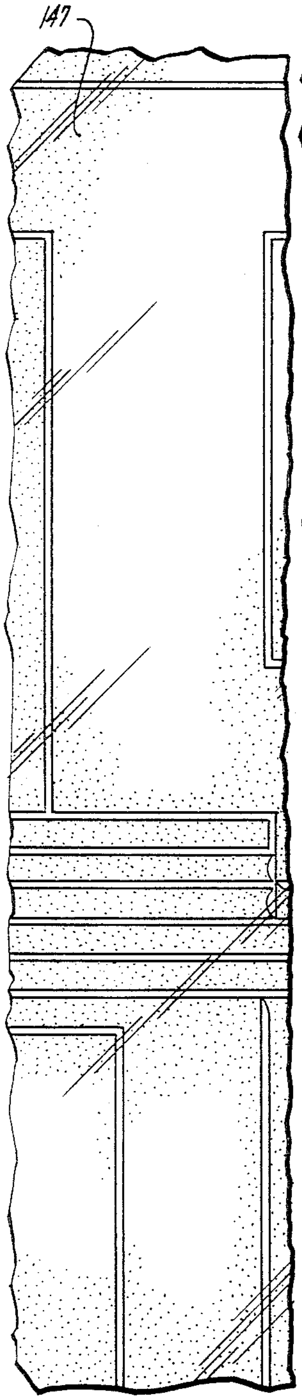
FIG. 17 is a partial plan view of a Color-Key negative made from the drawing shown in FIG. 16.
Figure 17A:
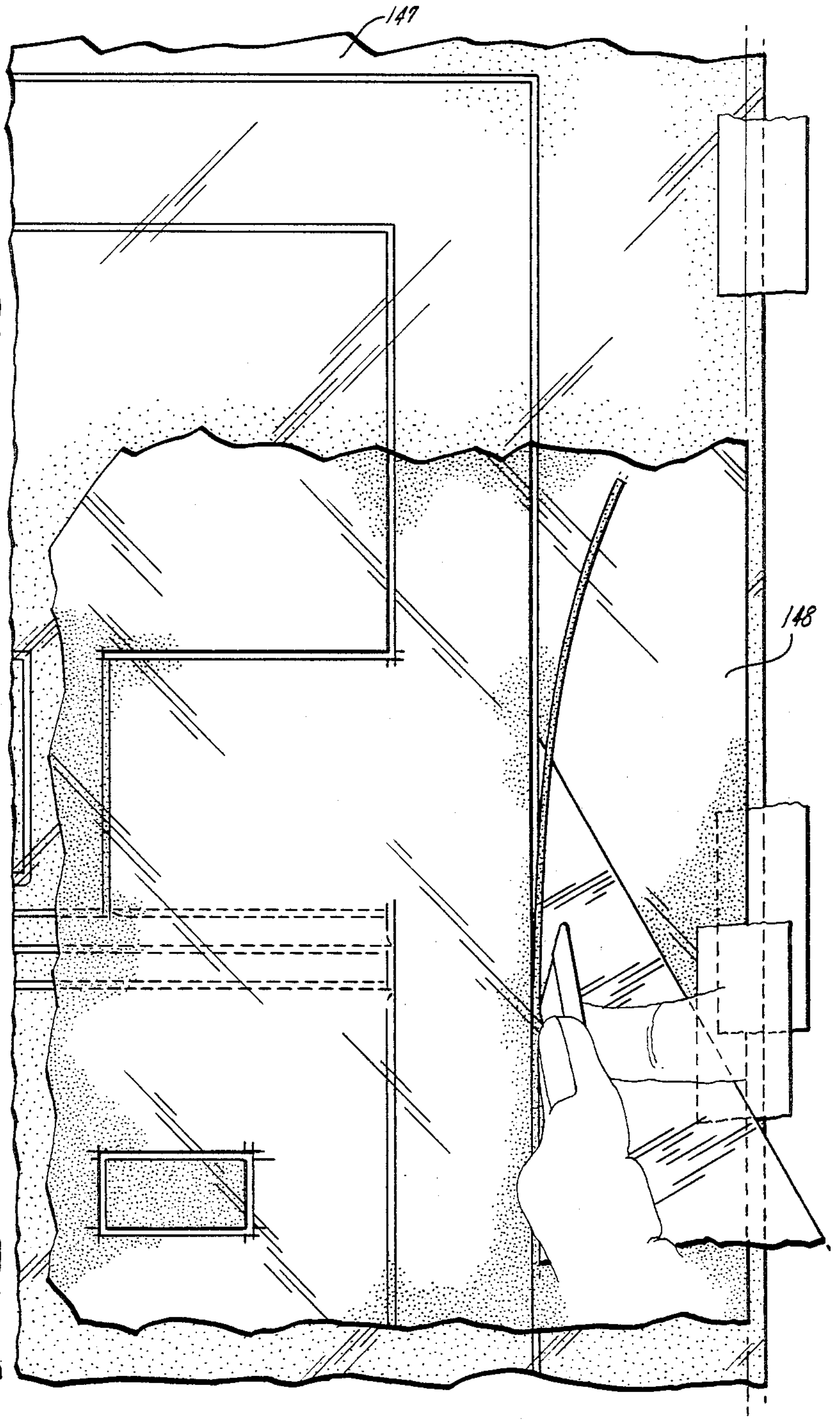
FIG. 17A is a partial plan view showing the method in which a positive is made from the drawing shown in FIG. 16 using a "Rubylith" sheet.

It is desirable that the drawing which is shown in FIG. 16 be provided on a sheet 146 of a suitable material which is capable of transmitting light, such as Mylar. This is desirable so that the drawing can be utilized with Color-Key sheets 147. As soon as the original drawing has been completed on the transparent sheet 146, the negative Color-Key sheet 147 can be placed over the same and exposed to a suitable source of light such as ultra-violet. Thereafter, the Color-Key sheet 147 can be developed in the manner described in copending application Ser. No. 824,197, filed May 13, 1969 to provide the pattern which is shown in FIG. 17. This pattern is a negative of the pattern which appears on the sheet 146. If desired, in place of making an ink drawing on transparent material, such as shown in FIG. 16, it is possible to provide a relatively simple pencil drawing of the integrated circuit and to thereafter prepare a sheet 148 of "Rubylith" and cutting into this sheet as shown in FIG. 17A by means of a precision knife or a Coordinatograph the pattern of the integrated circuit. In doing this, the red emulsion or film is removed from the undesired areas to leave the transparent backing material. In this way, the negative can be made directly from the print of the integrated circuit.

Figure 18:
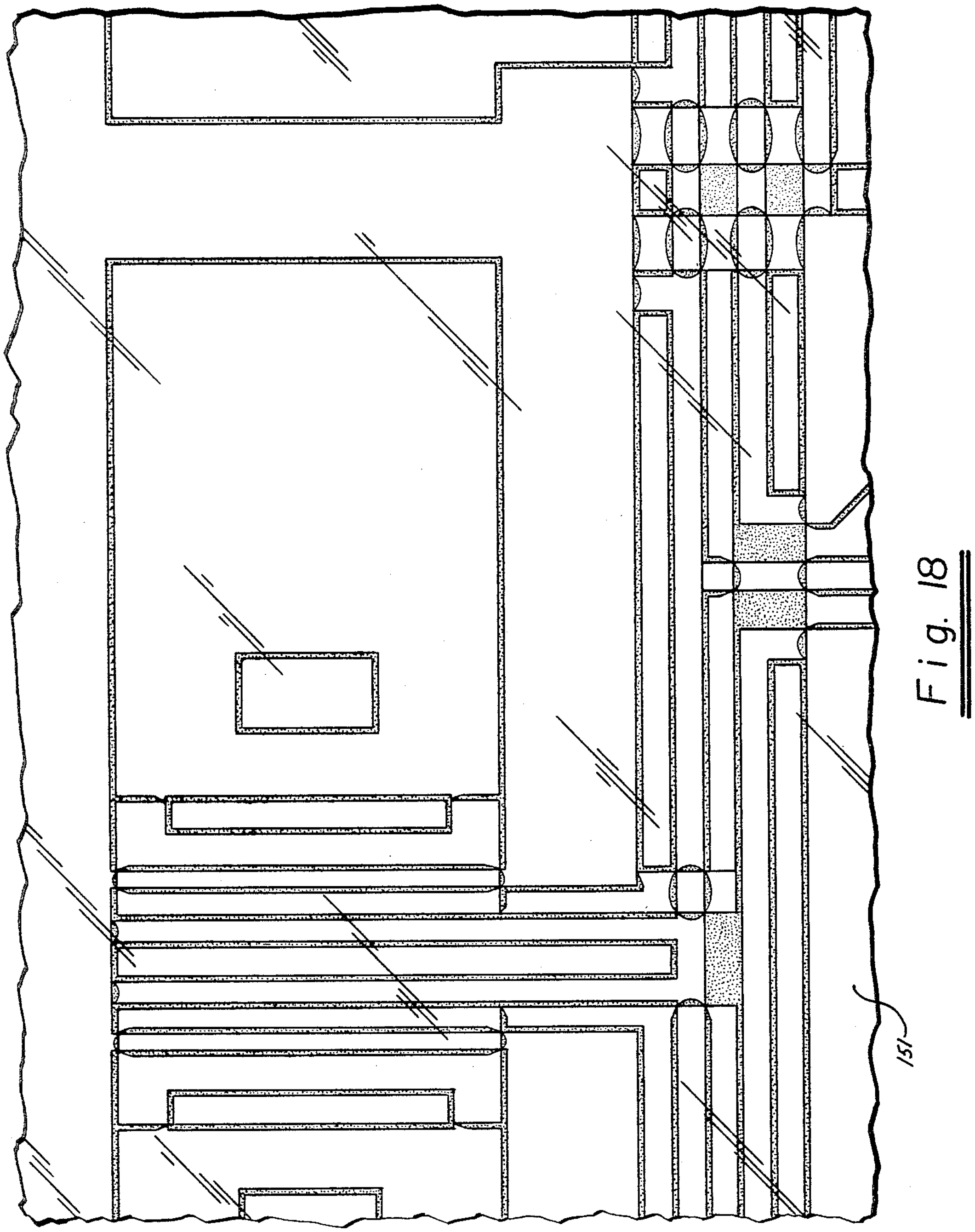
FIG. 18 is a partial plan view of the Color-Key positive made from the drawing shown in FIG. 16.

A Color-Key positive is then made from a negative of the type which is shown in either FIG. 17 or 17A. This Color-Key positive is shown on a Color-Key sheet 151 in FIG. 18. The negative Color-Key sheet 147 and the positive Color-Key sheet 151 are the basic components for making all of the masks as hereinafter described.

Figure 19:
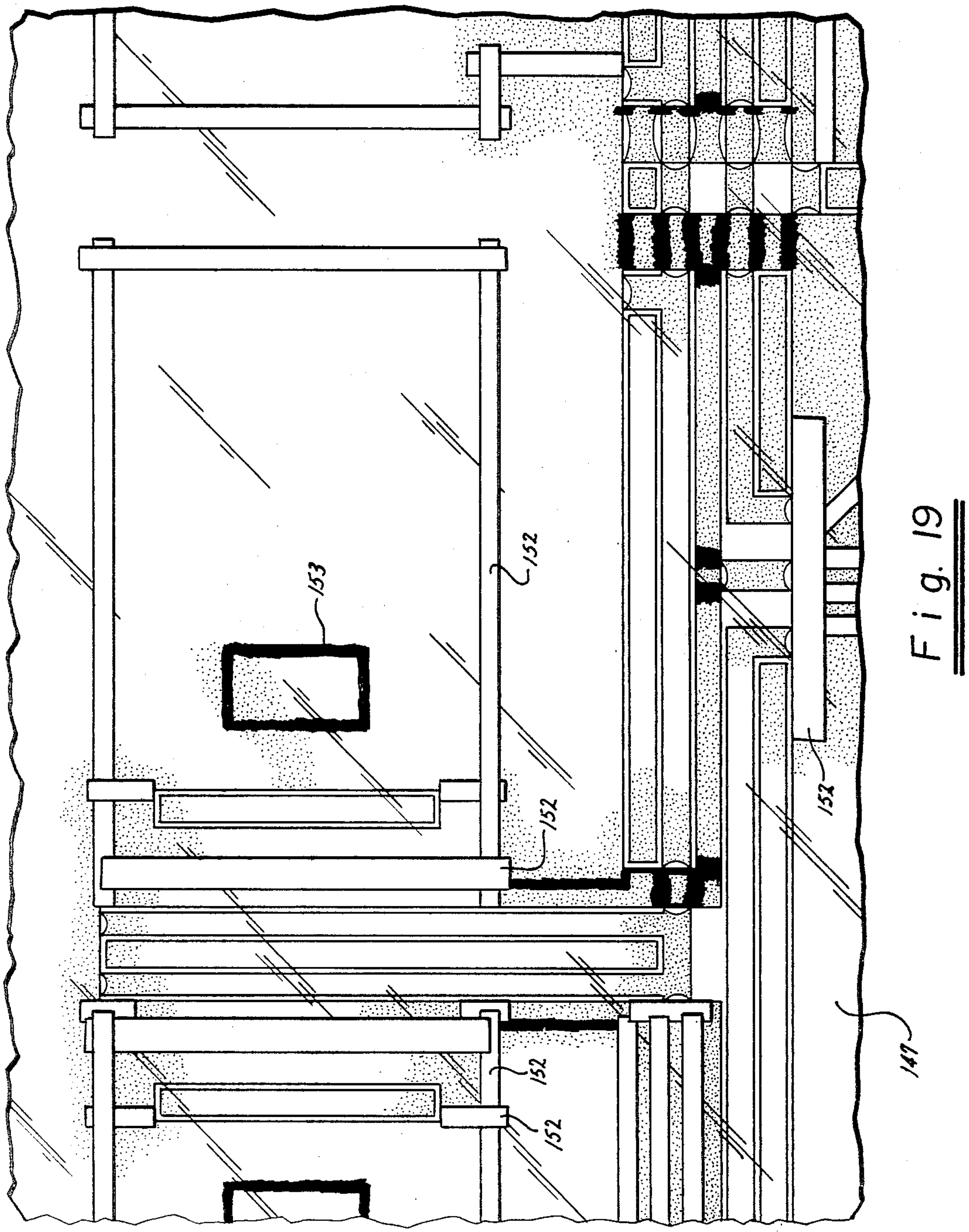
FIG. 19 is a partial plan view of a negative Color-Key sheet being modified so that it can be utilized from mask #1.

For making mask 1, the negative Color-Key sheet, like sheet 147 shown in FIG. 17, is taken and the regions which are not to be reproduced in mask 1 are blocked off so that they are opaque. For example, it is possible to use strips 152 of "Rubylith" material or any other opaque material and to secure the same to the sheet 147. Alternatively, if desired, the undesired portions can be covered by the use of an opaque ink 153 as shown in FIG. 19. The purpose of the masking operation which is performed in FIG. 19 is to prevent ultra-violet from passing through certain predetermined areas. As is well known to those skilled in the art, the ultra-violet will only penetrate the clear areas on the sheet 147. In general, in the masking or taping operation which is shown in FIG. 19, it is desirable to tape all regions which are not involved in making the diffusion beds for the MOS devices. It is for this reason that the bonding pads and other metallization lines have been taped over or inked out.

Figures 20, 20A:
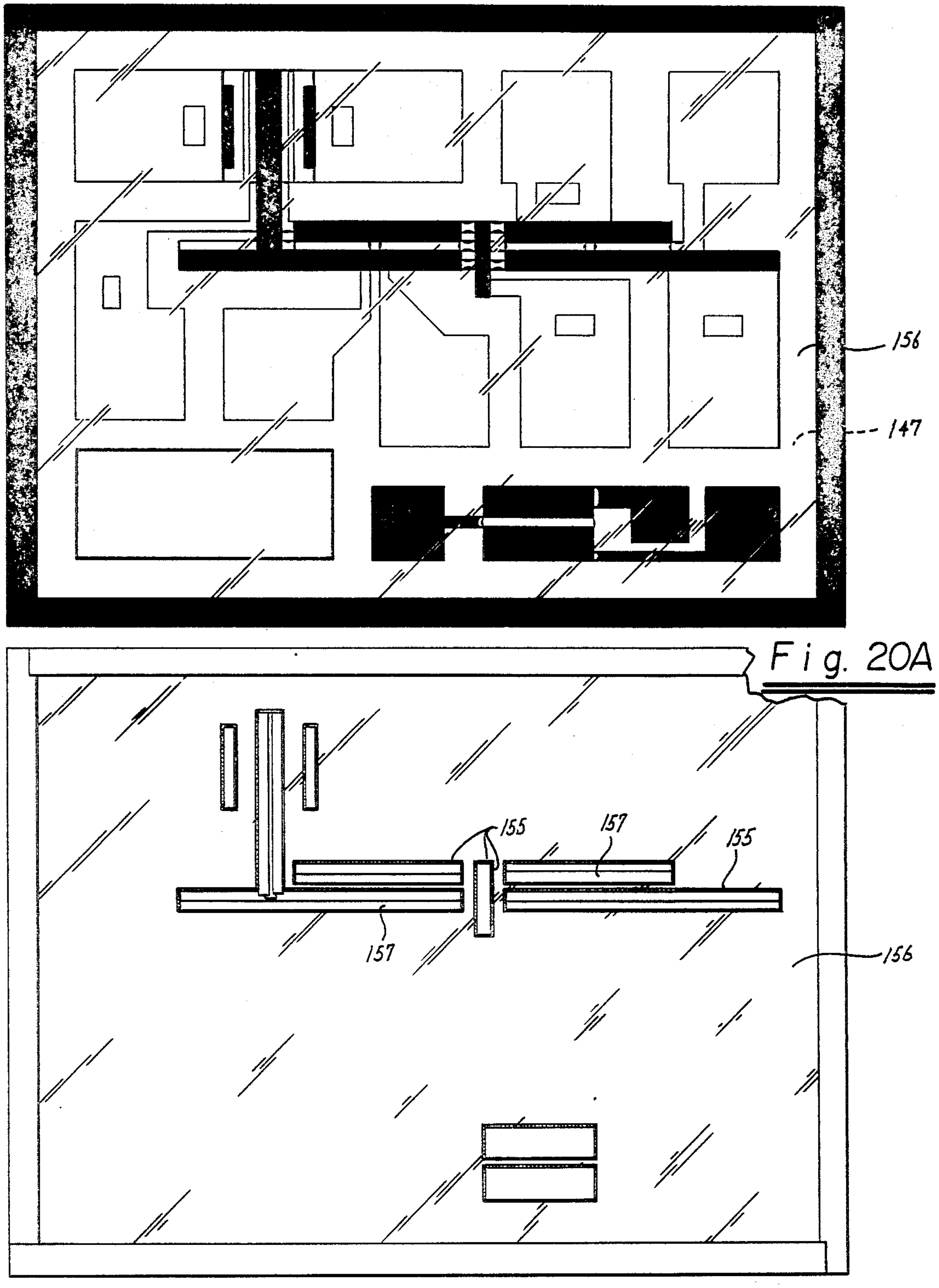
FIG. 20 is a plan view of the Color-Key positive made from the Color-Key negative shown in FIG. 19 and which is utilized for making mask #1.

As soon as the steps which are shown in FIG. 19 have been completed, a Color-Key negative sheet 156 is placed in contact with the sheet 147 and is exposed to ultraviolet light. The Color-Key sheet 156 is then developed to provide a positive for mask 1. The outer margins or edges 155 of the areas are precisely defined by the pattern. In addition, certain of the inside edges are precise. The edges 155 have been enlarged for clarity. However, there are areas in which the inside edges are not critical and in which it is necessary to fill in certain areas so that they are opaque. This, again, is accomplished by placing strips 157 over these areas as shown in FIG. 20. If desired, ink or other materials can be utilized to make such areas opaque to the ultraviolet light. As pointed out previously, this filling in with "Rubylith" tape or inking can be done very quickly by inexperienced personnel. In order to obtain the best contrast possible, black Color-Key sheets can be utilized when they are to be exposed photographically. FIG. 20A shows the relationship of the masked off areas to the complete integrated circuit shown in FIG. 16.

After the sheet 156 has been completed, it can be utilized directly for making mask 1. As explained, it can be hung on a wall and photographed to provide the desired reduction and the image stepped onto the glass substrate carrying an emulsion to provide the desired mask 1 which is utilized for making the integrated circuit.

Figures 21, 23:
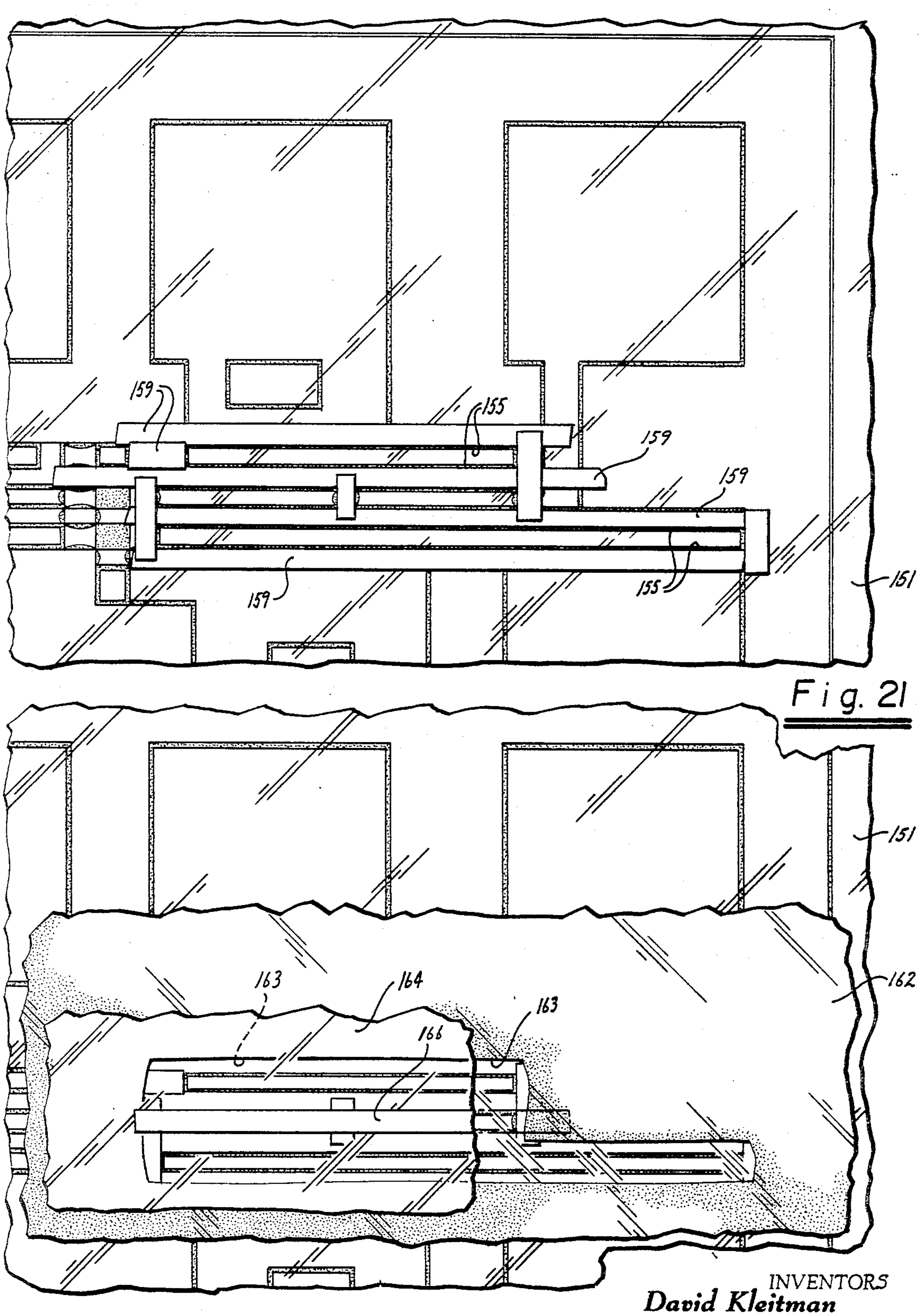
FIG. 21 is a partial plan view of a Color-Key positive which has been modified by the use of opaque strips so that it can be used for making mask #2.
FIG. 23 is a partial plan view of an assembly showing the manner in which the negative, which is shown in FIG. 21, can be modified to provide a negative for mask #3.
Figures 22, 22A:
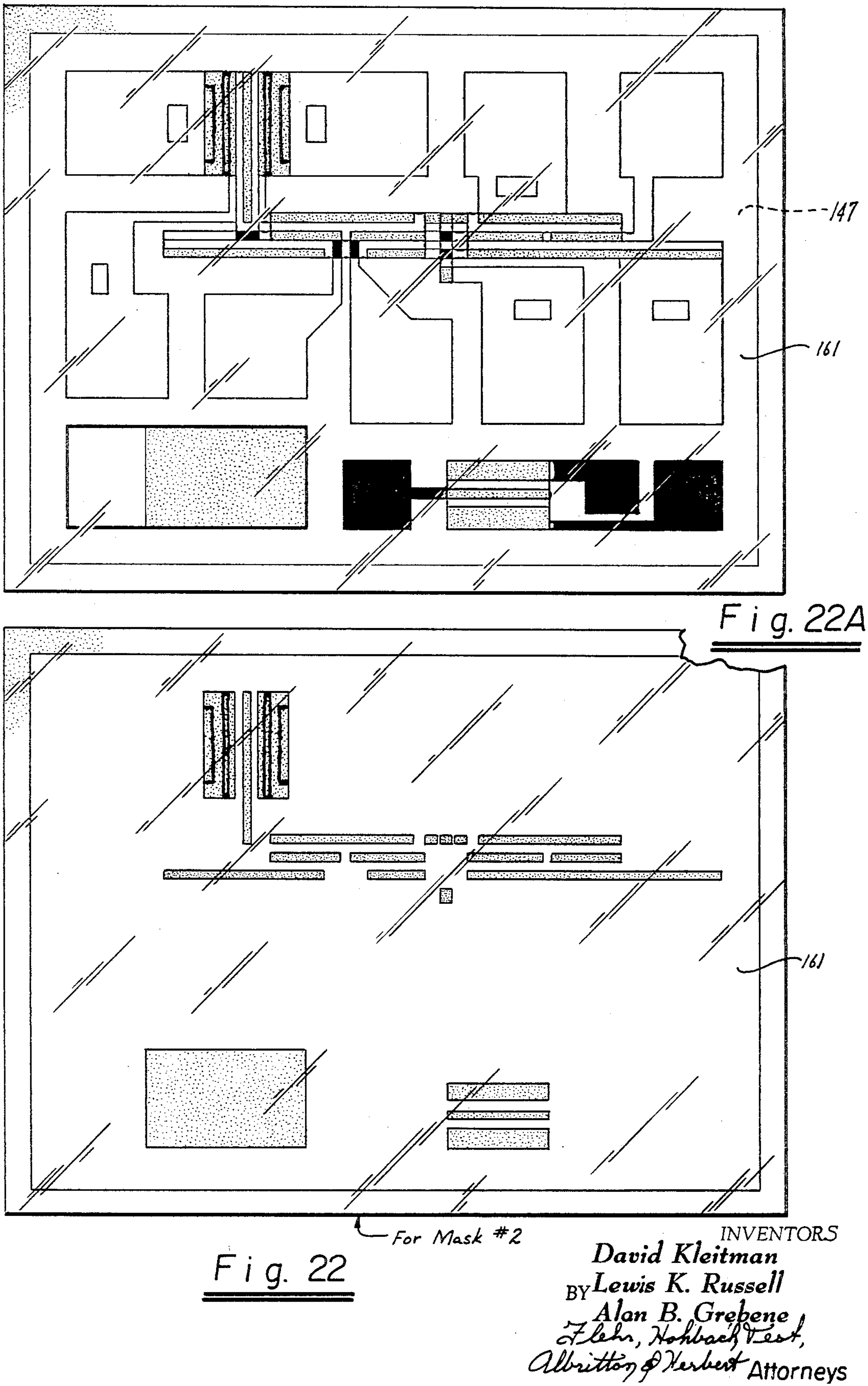
FIG. 22 is a plan view of a Color-Key positive made from the negative shown in FIG. 21 and which is utilized for making mask #2.

In the preparation of the second mask, the positive Color-Key sheet 151 is taken. Certain areas are made opaque by blocking them off with strips 159 of "Rubylith" material or by ink as shown in FIG. 21. In general, in the second mask, it is desired to define the contact windows and the gate areas. Thus, the "Rubylith" tape is placed so that all of the gate and contact windows are transparent. An additional large opaque sheet (not shown) with a window cut therein to expose the desired areas can be used to cover the undesired areas. A sheet 161 of unexposed and negative Color-Key material is then taken and is exposed to the pattern provided on the sheet 151 as shown in FIG. 22. FIG. 22A shows the relationship of the gate and contact areas to the complete integrated circuit shown in FIG. 16. In this case, the outside dimensions for the contact areas are very precise because these outside margins of the areas were not covered by the "Rubylith" material as shown in FIG. 21. This sheet 161 can then be photographed to provide the desired reduction to form mask 2 on a glass substrate or another suitable material.

Figure 24:
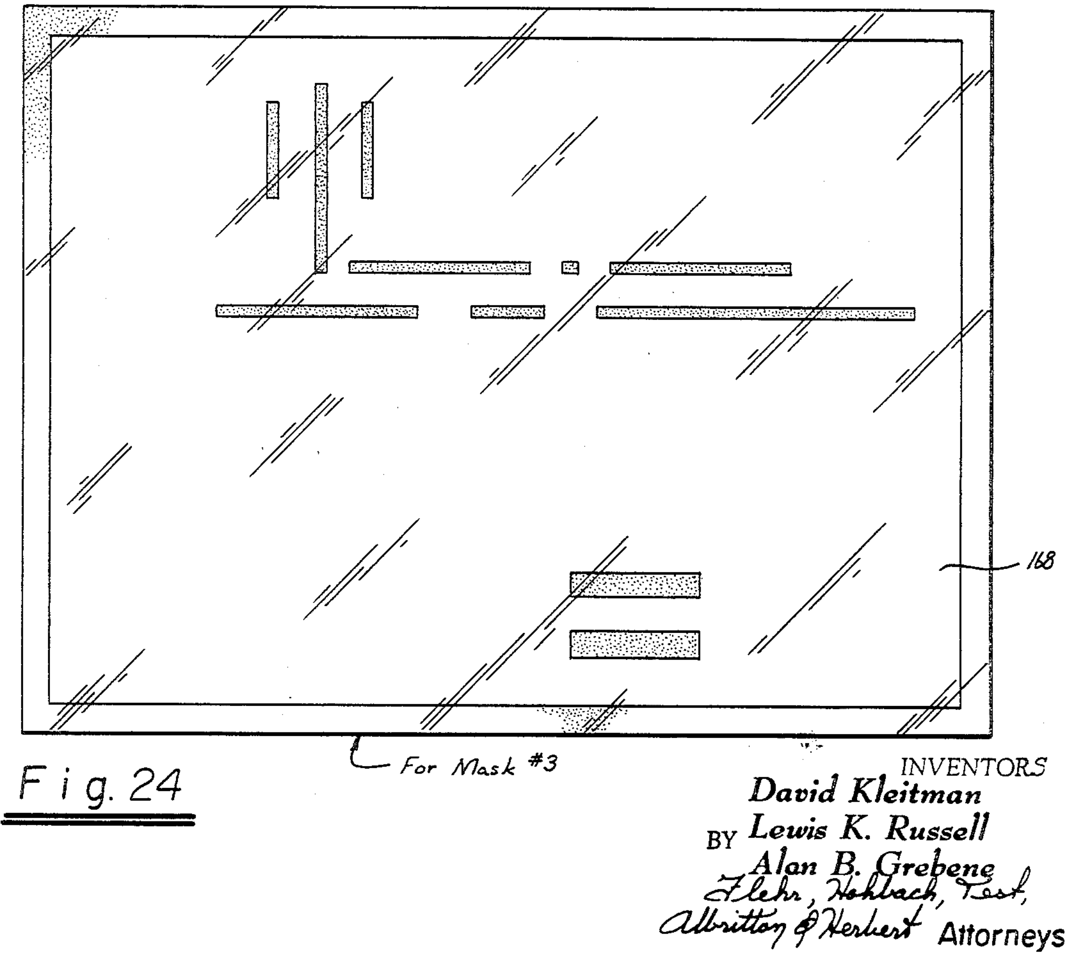
FIG. 24 is a plan view of a Color-Key positive made from the negative shown in FIG. 23.

To make mask 3 which is for the contact areas, it is merely necessary to tape out the gate areas from the mask which is shown in FIG. 21. This step is shown in FIG. 23 in which a large sheet 162 of suitable material such as "Rubylith" is placed over the top of the sheet 151. The film or emulsion is removed from an area 163 to expose the MOS devices through the transparent base. Another sheet 164 is then placed over the sheet 162. This sheet 164 is transparent and has secured thereto strips 166 which are utlized for covering the gate areas of the MOS devices. The strips 166 are formed of a suitable opaque material such as "Rubylith." A positive copy is then made from the assembly which is shown in FIG. 23 by utilizing a positive Color-Key sheet 168 which is exposed and developed. This leaves a pattern such as shown in FIG. 24 in which the gate areas have disappeared and only the contact stripes remain. The sheet 168 is utilized for making the third mask by photographing the same as has been done for making the other masks.

Figure 25:
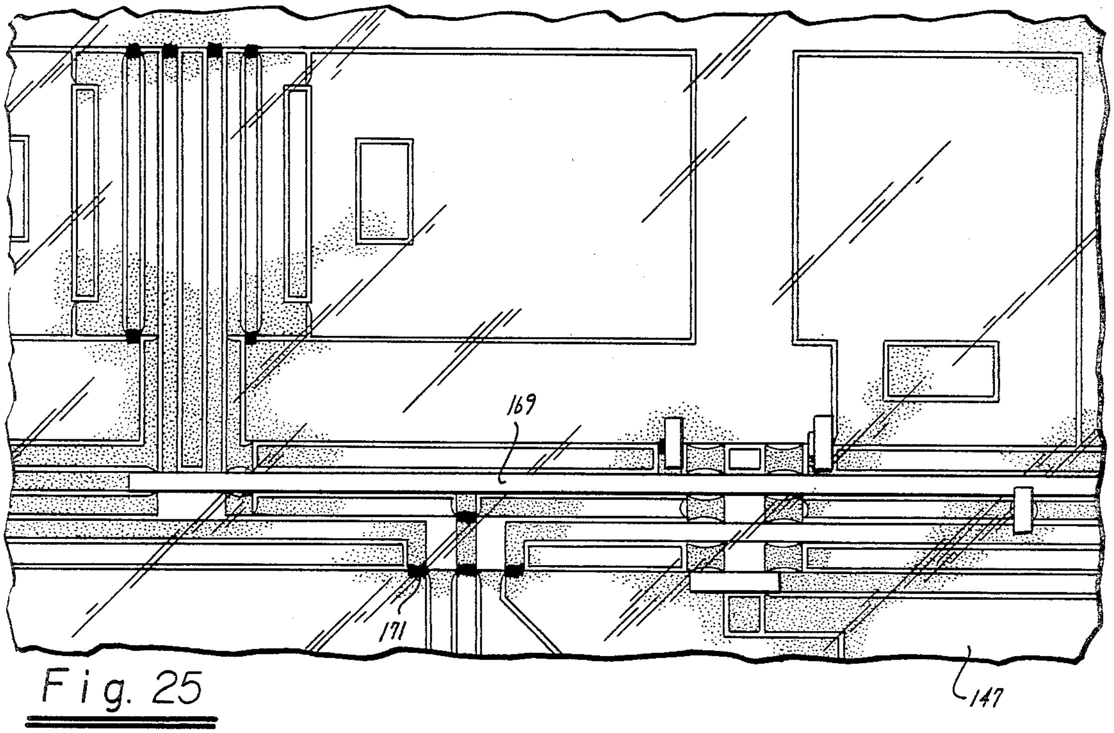
FIG. 25 is a partial plan view of a Color-Key negative showing modification by the use of opaque strips and ink to provide a pattern.
Figure 26:
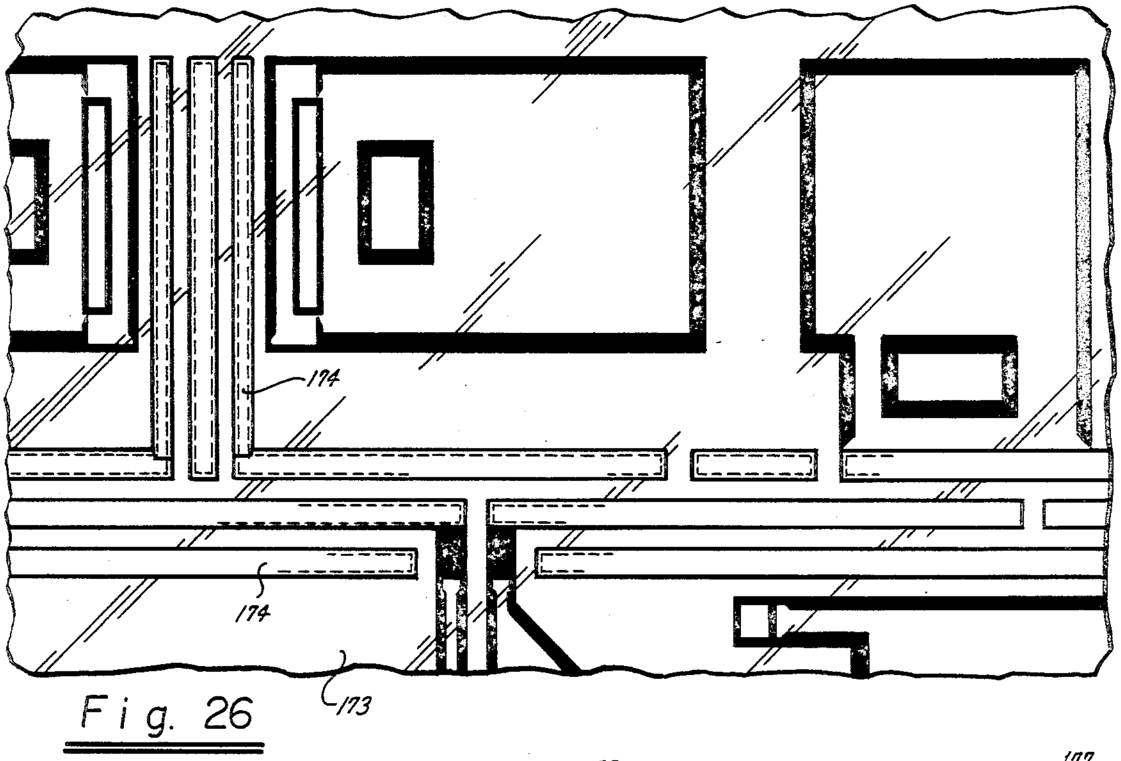
FIG. 26 is a partial plan view of a Color-Key positive which has been modified for use in making mask #4.

To make the fourth mask, it is desirable to start with an original negative Color-Key sheet such as sheet 147 from a "Rubylith" sheet. In this sheet 147, the various areas which are utilized for connecting the other areas are either taped or inked out by the use of strips of tape 169 and by patches of ink 171. A positive Color-Key copy is made from the sheet 147 which is shown in FIG. 25. This positive Color-Key sheet, after being exposed and developed, is shown as a sheet 173 in FIG. 26. All the metallization areas are then taped in by a suitable opaque material. As shown in FIG. 26, this can be accomplished by placing strips 174 of "Rubylith" material over the appropriate areas. Again, the placing of the strips of "Rubylith" material is not important as long as they remain within the confines of the lines which define the areas which are to be covered. The large areas, such as the pads, can also be covered in a similar manner.

Figure 26A:
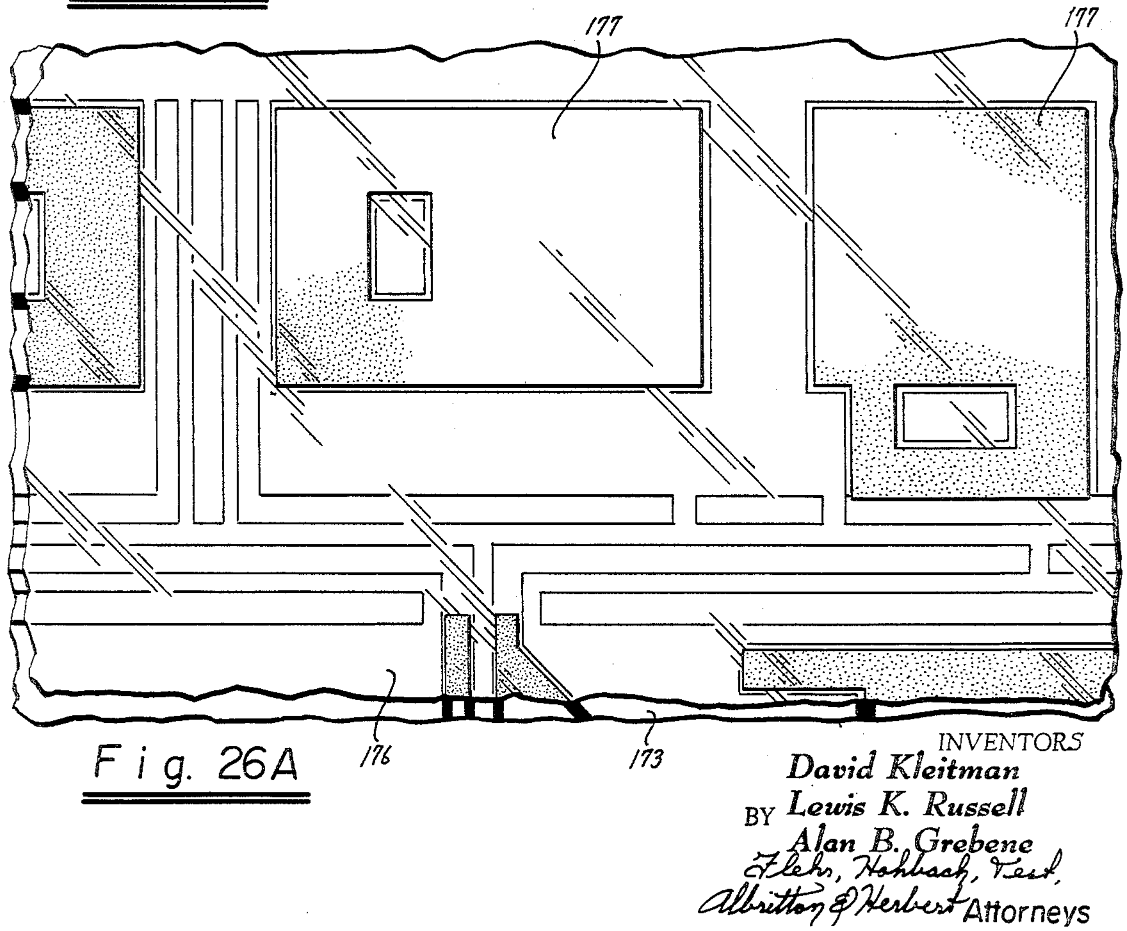
FIG. 26A is a partial plan view of an assembly showing the Color-Key sheet in FIG. 26 with a sheet of "Rubylith" in which the sheet of "Rubylith" is provided with opaque areas so that the assembly can be utilized for making mask #4.

As shown in FIG. 26A, a simple way is to take an additional sheet 176 of "Rubylith" and to overlay it over the sheet 173 and then with the Exacto knife to remove the undesired portions of the film from the "Rubylith" sheet so that there remains a large section 177 of "Rubylith" film. The two sheets 173 and 176 are then retained in superimposed positions and they are secured together by suitable means such as tape. As soon as this has been completed, the composite sheets 173 and 176 can be photographed in the manner hereinbefore described to provide mask 4.

Figure 26B:
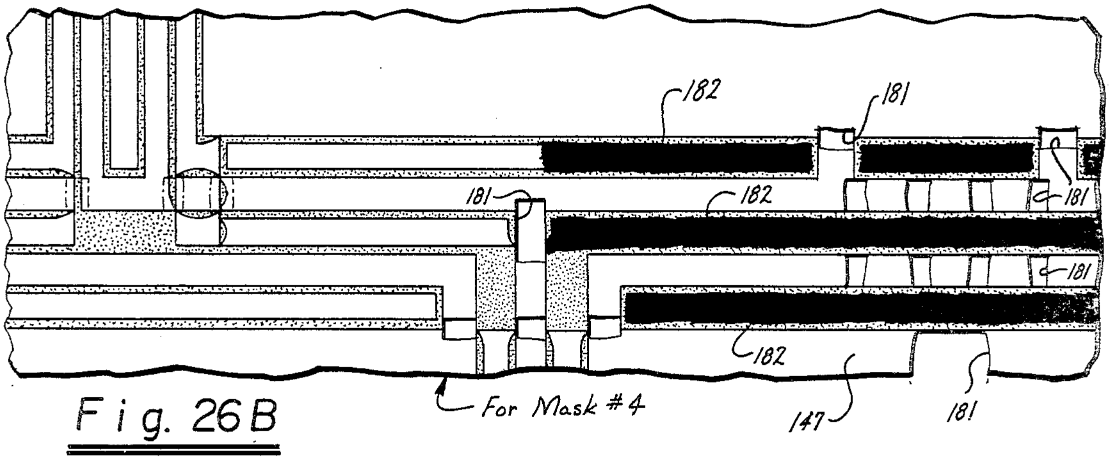
FIG. 26B shows an alternative method for making a Color-Key negative for mask #4.

Still another alternative way for obtaining mask 4 is shown in FIG. 26B which shows how it is possible to go directly to a positive without making an intervening negative. This can be accomplished by the use of a ruling edge and a sharp knife. In this case, sheet 147 is taken and the interconnecting links removed by cutting out sections 181 from the sheet 147. These sections carry the undesired connecting links. The middle areas are filled in by use of ink 182. Also, it should be pointed out that rather than cutting out the interconnecting links, it is possible to erase the same. It is relatively easy to remove the connecting links and to do it very precisely with a knife or an erasure. This is because of the half-moon shapes of the portions which form the connecting links. The half-moon shapes are of such a size that the edges of the moon terminate adjacent to the edge of the area so that when disconnecting a link, it is merely necessary to cut a very fine line at each end of the moon-shaped connecting link and thereafter erasing or removing the same. A sheet made in this manner can be used directly for shooting mask 4.

Figure 27:
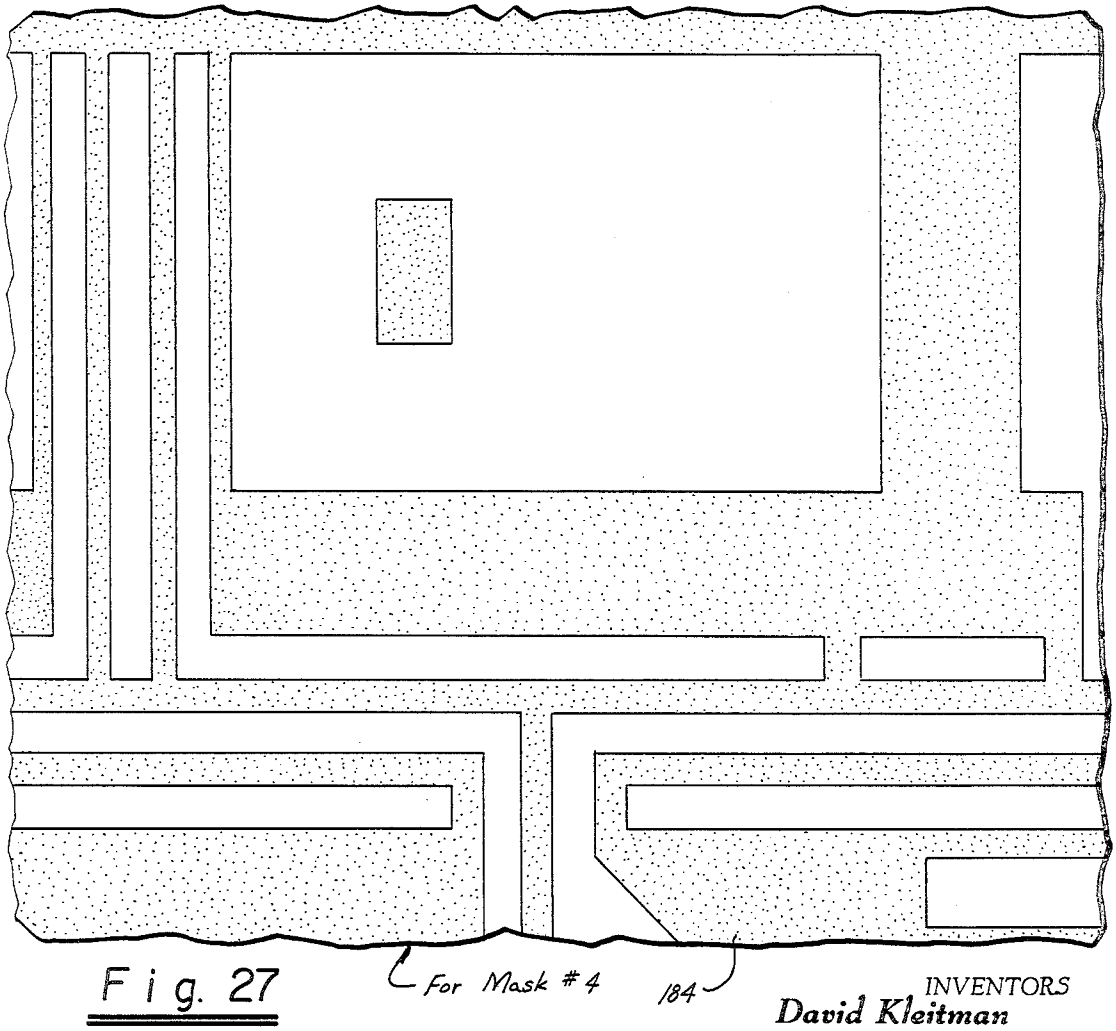
FIG. 27 is a partial plan view of a Color-Key negative made from the assembly shown in FIG. 26A for making mask #4.

FIG. 27 is a sheet 184 which is utilized for making the fourth mask. It is a negative color-key sheet of a suitable color such as black which has been exposed to the composite pattern which is shown in FIG. 26A. The sheet 184 can be photographed to provide the fourth mask in the manner hereinbefore described for the other masks.

After the masks 1 through 4 have been completed, these masks can be utilized to fabricate integrated circuits utilizing MOS devices in a manner well known to those skilled in the art.

Figure 28:
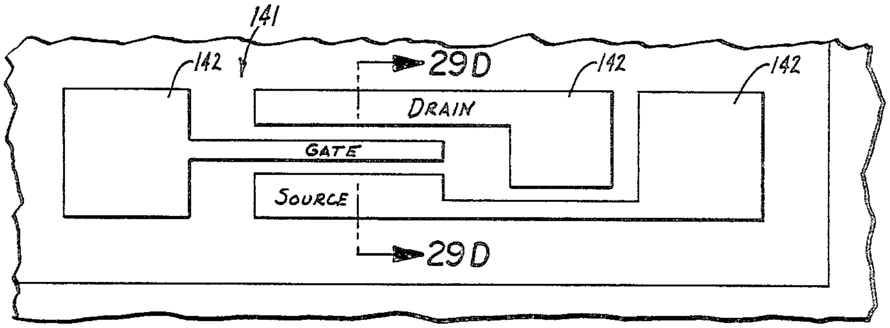
FIG. 28 is an enlarged partial view of the test transistor shown in FIG. 16.

In FIG. 28 there is shown an enlarged view of the test transistor which is utilized in conjunction with the fabrication of the integrated circuit that is shown in FIG. 16. The typical steps for making an MOS transistor of the type shown in FIG. 28 are shown in FIGS. 29A through 29D. From FIG. 29A it can be seen that the MOS device is formed in a semiconductor body 191 of a suitable type such as silicon. A layer 192 of a suitable insulating material such as silicon dioxide is formed on the upper planar surface 193 of the body 191. The first mask formed in the manner hereinbefore described is utilized for forming openings or windows 194 in the oxide to expose areas of the upper surface 193. This is carried out in a manner well known to those skilled in the art, for example, a layer of photoresist can be placed on the oxide layer 192 and exposed through mask 1, and thereafter developed. After the photoresist has been developed certain areas are exposed. A suitable etch is then utilized to attack the exposed areas and to provide the openings 194. The source and drain are then formed by diffusing impurities through the openings 194 and providing the diffused beds 196 and 197. Thus, it can be seen that the first mask is utilized for producing the source and drain areas.

Figures 29A, 29B, 29C, 29D, 30, 31, 32:
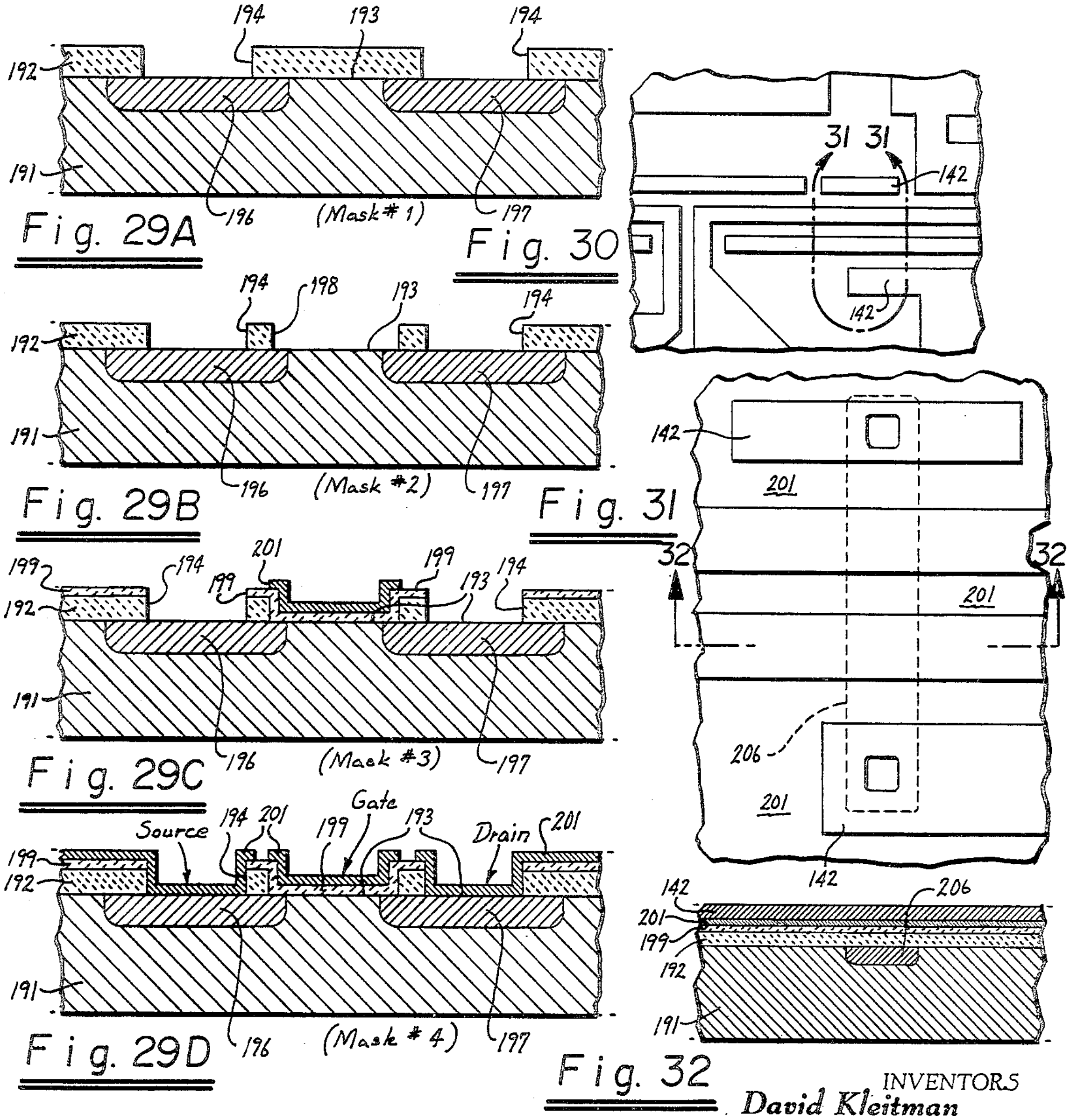

Thereafter, mask 2 is utilized in a manner similar to mask 1 to provide additional openings or windows 198 which are utilized for the gate and contact areas. Thereafter, as shown in FIG. 29C, a thin layer of silicon dioxide is deposited upon the oxide 192 and in the windows 194 and 198. This thin layer can be of any suitable depth such as 1000 angstroms. As soon as the thin silicon dioxide layer 199 has been deposited, a layer 201 of ultra-pure aluminum is immediately evaporated on the surface of the thin layer 199.

The third mask is then utilized for cutting windows in the layer 201 and in the thin dioxide 199. This is done by conventional photoresist techniques and then utilizing an etch for removing the aluminum and then utilizing a different etch to remove the thin silicon dioxide layer to expose the source and drain regions 196 and 197.

As soon as this has been accomplished, additional aluminum is evaporated onto the aluminum layer 201 and into the openings 194 to make contact with the source and drain regions as shown in FIG. 29D. Thereafter, mask 4 is utilized for etching away the aluminum in areas where it is not desired. This, again, is accomplished by suitable photoresist techniques and then etching away the undesired aluminum by an etch through the windows formed in the photoresist. Thus, as shown in FIG. 28, the gate source and drain contacts 142 are isolated from each other.

An enlarged view of a portion of the integrated circuit shown in FIG. 16 is shown in FIG. 30. FIGS. 31 and 32 show the manner in which a cross-under is formed in the integrated circuit. Such a cross-under is formed by a diffused bed 206 which is formed in a conventional manner. The diffused bed extends between the metallization 142 as shown in FIG. 31. This diffusion bed underlies the thick silicon dioxide layer 192, the thin silicon dioxide layer 199, the thin layer of aluminum 201 and the thick layer of aluminum 142.

Figure 33:
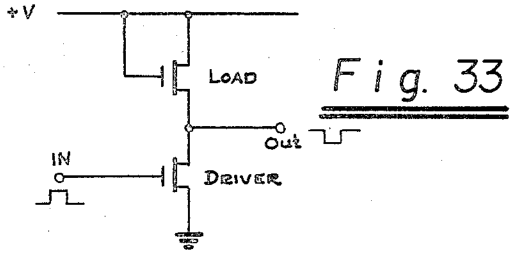
FIG. 33 is a circuit diagram of a logic block with an inverter which contains two MOS devices with one of the devices being a load device and the other being a driving device.

In FIGS. 34–48 there are shown the various steps required for making the masks utilizing a still different embodiment of the present method to provide an integrated circuit of the type shown in FIG. 33.

FIG. 33 shows a circuit diagram of a complete logic block in the form of an inverter which contains two MOS devices, one of the devices being a load device and the other of the devices being a driving device with the necessary inputs and outputs. It should be appreciated that any logic element could be utilized for FIG. 33. For example, it could be a flip-flop, a memory cell or a part of a shift register.

Figure 34:
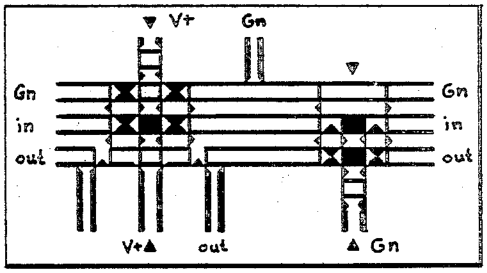
FIGS. 34–48 show the various steps which are required for making the masks required for making the integrated circuit shown in FIG. 33.

In FIG. 34, there is shown a drawing of the complete logic block which is shown in FIG. 33. This drawing serves as the original.

Figure 35:
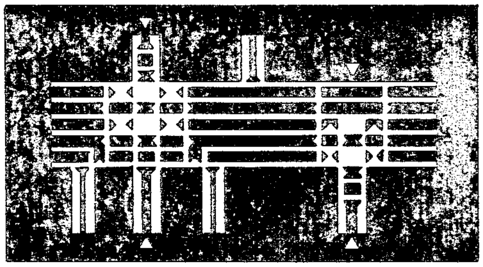
Figure 36:
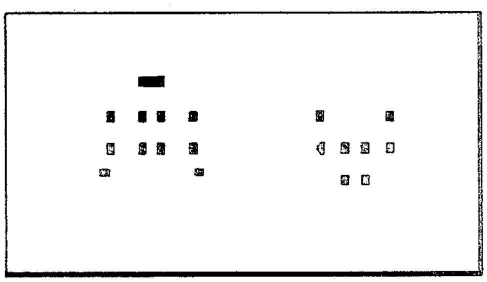
Figure 37:
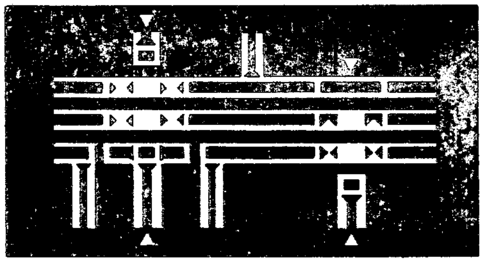

In FIG. 35, a negative of the positive shown in FIG. 34 is shown in FIG. 35 and is made by the use of Color-Key material. The pattern which is shown in FIG. 37 is made by superimposing the sheet in FIG. 36 on the sheet in FIG. 35 and then exposing Color-Key material through the same to provide the pattern in the sheet which is shown in FIG. 37. The pattern on the sheet shown in FIG. 36 can be readily made by hand since it is so simple. By comparing the pattern shown in FIG. 37 with that shown in FIG. 35, it can be seen that a number of the interconnect triangles have been blocked out.

Figure 38:
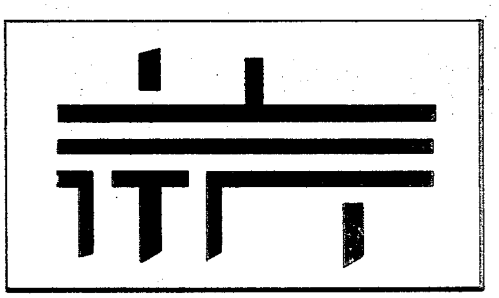
Figure 39:
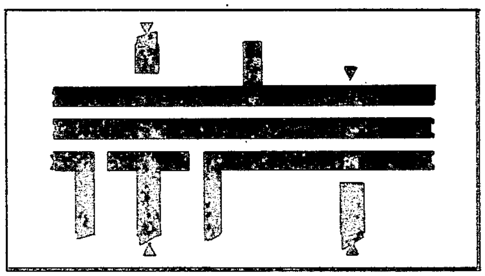
Figure 40:
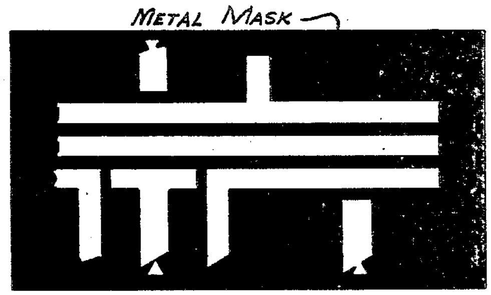
Figure 41:
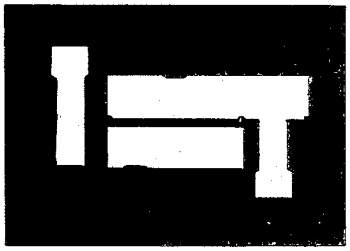
Figure 42:
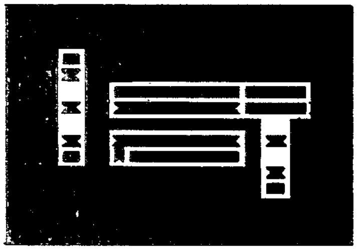

By using the combination of the sheets shown in FIGS. 38 and 37 and exposing a sheet of Color-Key material, it can be seen that a pattern such as that shown in FIG. 39 is produced. As can be seen from FIG. 39, the pattern shown in FIG. 38 covers the interior of certain areas. The pattern in FIGS. 38 and 39 differs in that the pattern shown in FIG. 39 has very precisely defined outer margins or edges, whereas the pattern shown in FIG. 38 does not. In general, the outlines in FIG. 38 have a width which is less than the width of the lines shown in FIG. 39. The pattern shown in FIG. 39 is a positive image of the mask and this pattern is copied to provide a negative of the mask as shown in FIG. 40. This mask shown in FIG. 40 serves as a metal mask. It can be copied in a conventional manner by a step and repeat camera to provide the multiple images on a mask which is to be utilized for production purposes.

Figure 43:
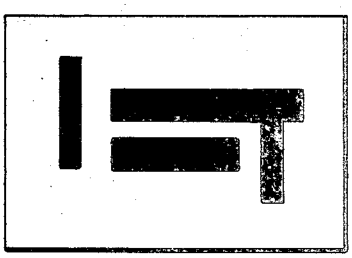
Figure 44:
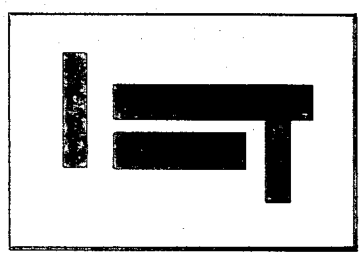
Figure 45:
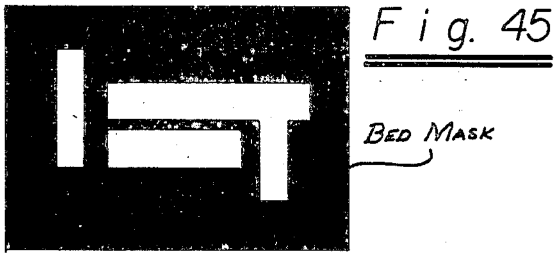

Next, an overlay pattern such as shown in FIG. 1 is utilized in combination with the mask shown in FIG. 35 to blank out certain areas so that when the combination is exposed to a sheet of Color-Key material, the mask as shown in FIG. 43 is provided. It can be seen that the overlay pattern shown in FIG. 1 is blanked out in different connecting portions to provide the resulting pattern shown in FIG. 42. Another overlay pattern is shown in FIG. 43 and is utilized in conjunction with FIG. 42 to provide the pattern shown in FIG. 44. It can be seen that the pattern shown in FIG. 43 fills in the interior areas of the pattern shown in FIG. 42. The positive image shown in FIG. 44 is then photographed utilizing Color-Key material to provide the bed mask shown in FIG. 45.

Figures 46, 47, 48:
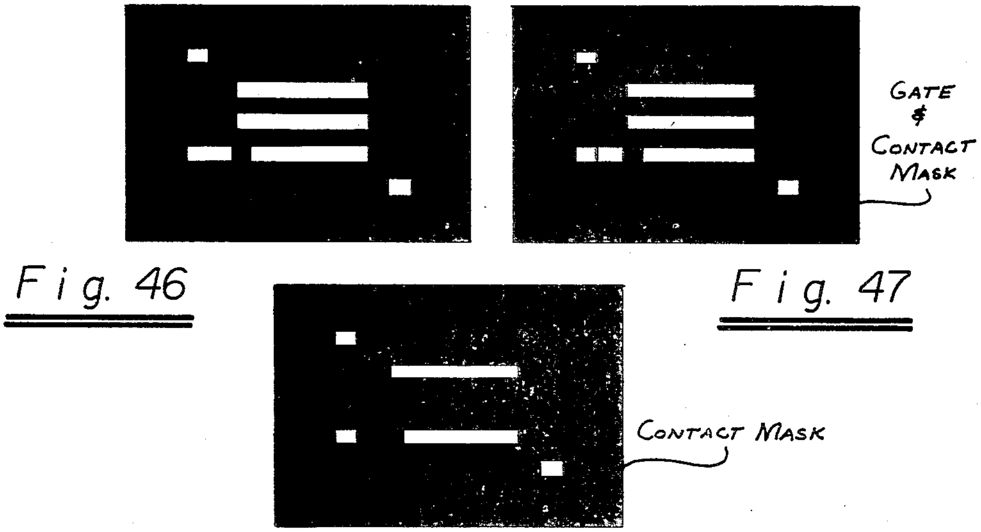

To obtained the contact mask, an overlay as shown in FIG. 46 is utilized in conjunction with the drawing which is shown in FIG. 34 to provide a gate and contact mask which is shown in FIG. 47. The overlay mask which is shown in FIG. 46 serves to define the small interior areas.

The contact mask which is shown in FIG. 48 is then obtained by utilizing the gate and contact mask shown in FIG. 47 and blocking out the gate areas by suitable means such as "Rubylith" tape and then photographing the same with Color-Key material to provide the contact mask shown in FIG. 48.

It can be seen that this process which is disclosed in FIGS. 34–48 is particularly advantageous where repetitive patterns are utilized in different integrated circuits. With such an arrangement, the desired parts can be taped out without the necessity of taping each individual pattern.

In making good contact between the Color-Key sheets, a conventional adhesive which absorbs very little light can be utilized for fastening the two sheets together. Thus, when it is desired to copy the circuit onto photographic film, the adhesive in no way interferes with the copying. In addition, the adhesive is such that it does not harden and, therefore, it is laways possible to strip off any layer when one would like to change or modify the original pattern.

It can be seen from the foregoing that there has been provided a method for integrated circuit mask fabrication and assembly for use therewith. The method is particularly advantageous in that it eliminates the need for cutting "Rubyliths" for each of the masks. Negatives and/or positives are utilized which can be readily modified to provide the desired mask. The modification of the negatives and positives is easy because there are no critical dimensions which must be adhered to in modifying the same. All the critical edges for the areas are actually drawn onto or laid out in the original layout and are accurately reproduced by the negatives and the positives. The lines which are used are thick enough so that non-critical hand paste-in ink and erasures and the like can be utilized for the modifications. In the original drawing, the width of the lines, wherever possible, is made quite thick in a direction away from the perimeter of the area.

With the foregoing method, all the masks are coherent with each other. In other words, they are in exact alignment because they are all copies of the same original.

The method also particularly lends itself to modular circuit layout techniques, i.e., a new module can be added to an existing circuit layout in the mask for the circuit omitted by adding the additional module to the circuit and to the mask. These new modules can be kept in a library and thus can be readily added to existing circuit layouts with very little difficulty. This method particularly lends itself to integrated circuitry where circuit functions can be readily placed in modular form.

We claim:

1. In a method for integrated circuit mask fabrication, preparing a drawing of at least a substantial portion of the integrated circuit in which the drawing is many times the size of the integrated circuit so that the pattern for the integrated circuit is formed by relatively wide lines which have certain edges which carry critical mask information, preparing negatives and positives from said drawing and modifying the negatives and the positives while still retaining the image of the edges thereon for the desired mask so that they differ from the drawing so that each can be used for making one of a plurality of the masks required for fabrication of the integrated circuit and making a plurality of masks utilizing said modified negatives and positives for use in the fabrication of each integrated circuit.

2. A method as in claim 1 wherein said modifications are accomplished by making alterations to at least one of the negatives and the positives by making modifications which are within the perimeters of areas which are defined by the lines and which do not extend to the edges of the perimeters.

3. A method as in claim 1 wherein certain of said negatives and positives are modified by placing additional opaque areas on the same.

4. A method as in claim 3 wherein at least certain of said negatives and positives are modified by removing opaque areas from the negatives and the positives.

5. A method as in claim 1 together with the step of placing strips of opaque material within certain of the areas of at least one of the negatives or positives so that strips of material extend inwardly from the perimeter of the area but do not extend to the perimeter of the area.

6. A method as in claim 1 wherein said drawing is coded to indicate predetermined areas to facilitate making of the modifications to the negatives and positives.

7. A method as in claim 1 wherein said drawing is provided with metal interconnections and the metal interconnections are in the form of sector-shaped segments.

8. A method as in claim 1 wherein at least one of the negatives or positives can be modified more than once for use in making more than one of the masks.

9. A method as in claim 1 together with a step of utilizing an additional sheet of material having predetermined areas thereon corresponding to certain areas of the integrated circuit and adapted to be utilized in connection with at least one of the negatives and the positives for making a mask.

10. A method as in claim 9 wherein said additional sheet of material is provided with opaque areas.

References Cited

UNITED STATES PATENTS

| | | | |
|---|---|---|---|
| 2,972,533 | 2/1961 | Frankau et al. | 96—43 |
| 3,477,848 | 11/1969 | Pritchard, Jr. | 96—36.2 |
| 3,288,607 | 11/1966 | Middleton, Jr. | 96—36.2 |
| 3,169,063 | 2/1965 | Johnston et al. | 96—41 |
| 3,508,919 | 3/1970 | Reimer | 96—36.2 |

OTHER REFERENCES

Barrows et al.: "Photography Speeds Printed Circuit Design," Electronics, Apr. 7, 1961, pp. 102–105.

IBM Technical Disclosure Bulletin, vol. 7, No. 7, December 1964, pp. 628–629.

Ulano Advertisement, SCP and Solid State Technology, April 1966, p. 14.

NORMAN G. TORCHIN, Primary Examiner

E. C. KIMLIN, Assistant Examiner

U.S. Cl. X.R.

96—36.2, 43